(12) United States Patent
Choi

(10) Patent No.: US 11,473,701 B2
(45) Date of Patent: Oct. 18, 2022

(54) CONNECTING DEVICE AND PIPE PRESS-FIT CONNECTING APPARATUS USING THE SAME

(71) Applicant: Dasung Tech Co., Ltd., Icheon-si (KR)

(72) Inventor: Jong Seok Choi, Anseong-si (KR)

(73) Assignee: Dasung Tech Co., Ltd., Icheon-si (KR)

( * ) Notice: Subject to any disclaimer, the term of this patent is extended or adjusted under 35 U.S.C. 154(b) by 465 days.

(21) Appl. No.: 16/403,347

(22) Filed: May 3, 2019

(65) Prior Publication Data

US 2019/0338870 A1 Nov. 7, 2019

(30) Foreign Application Priority Data

May 3, 2018 (KR) .......................... 10-2018-0051386

(51) Int. Cl.
*F16B 21/16* (2006.01)
*B21D 39/04* (2006.01)
(Continued)

(52) U.S. Cl.
CPC .......... *F16L 13/141* (2013.01); *B21D 39/048* (2013.01); *F16B 21/06* (2013.01);
(Continued)

(58) Field of Classification Search
CPC .. F16B 21/065; F16B 21/183; F16B 2021/14; F16B 21/16; B21D 39/048; Y10T 403/604; Y10T 403/587
See application file for complete search history.

(56) References Cited

U.S. PATENT DOCUMENTS 1,981,541 A * 11/1934 Clark ...................... F16B 21/16
411/351
2,180,516 A * 11/1939 Gehnrich ................ E05C 9/048
292/341.15
(Continued)

FOREIGN PATENT DOCUMENTS

CH 687368 A5 11/1996
CN 2079678 U 6/1991
(Continued)

OTHER PUBLICATIONS

Office Action of corresponding Japanese Patent Application No. 2019-087442—7 pages (dated Jul. 20, 2020 ).
(Continued)

*Primary Examiner* — Michael P Ferguson
(74) *Attorney, Agent, or Firm* — Knobbe Martens Olson & Bear LLP

(57) ABSTRACT

A pipe press-fit connecting apparatus includes a connecting device. The connecting device may be used to connect a connected unit to a pressing power providing unit. The connecting device includes a fastener and a coupling pin. The fastener is installed at one end of the installation hole on an exterior surface of a cylinder block and has a fastening pin configured to be resiliently arranged and at least partially be exposed to the installation hole. The coupling pin is inserted through the installation hole and the insertion hole through another end of the installation hole on the exterior surface of the cylinder block to be resiliently coupled to the fastening pin to couple the connected unit to the pressing power providing unit.

7 Claims, 18 Drawing Sheets

(51) Int. Cl.
*F16L 13/14* (2006.01)
*F16B 21/07* (2006.01)
*F16B 21/18* (2006.01)
*F16B 21/06* (2006.01)

(52) U.S. Cl.
CPC .............. *F16B 21/07* (2013.01); *F16B 21/16* (2013.01); *F16B 21/18* (2013.01); *F16B 21/183* (2013.01); *F16B 21/186* (2013.01); *F16B 21/076* (2013.01); *Y10T 403/604* (2015.01)

(56) References Cited

U.S. PATENT DOCUMENTS

| | | | | | |
|---|---|---|---|---|---|
| 2,487,084 | A | * | 11/1949 | Weiss | F16B 21/16 411/347 |
| 3,214,187 | A | * | 10/1965 | Herbert | B62B 1/125 280/654 |
| 4,596,345 | A | * | 6/1986 | Beckers | B22D 41/38 222/600 |
| 6,151,754 | A | * | 11/2000 | Chen | E05C 17/52 16/85 |
| 6,244,085 | B1 | | 6/2001 | Dummermuth | B25B 27/10 72/31.01 |
| 6,343,824 | B1 | * | 2/2002 | Foy | A44B 11/2519 24/579.11 |
| 6,434,998 | B2 | * | 8/2002 | Amherd | B21D 39/048 29/237 |
| 7,036,806 | B2 | * | 5/2006 | Amherd | B21D 39/048 269/3 |
| 7,159,910 | B2 | * | 1/2007 | Hwang | E05C 19/028 292/341.15 |
| 7,216,523 | B2 | * | 5/2007 | Frenken | B21D 39/048 29/237 |
| 7,264,284 | B2 | * | 9/2007 | Hsu | E05C 19/04 16/82 |
| 7,578,159 | B2 | * | 8/2009 | Bowles | B21D 39/048 72/409.01 |
| 7,700,902 | B2 | * | 4/2010 | Mock | F42B 10/64 244/3.24 |
| 7,814,827 | B2 | * | 10/2010 | Frenken | F16B 21/04 100/102 |
| 8,245,561 | B2 | * | 8/2012 | Frenken | B25B 27/10 72/453.18 |
| 8,316,685 | B2 | * | 11/2012 | Stucki | B25B 27/10 72/452.8 |
| 8,336,362 | B2 | * | 12/2012 | Frenken | B25B 27/10 72/416 |
| 8,342,001 | B2 | * | 1/2013 | Zhang | B25B 27/10 72/453.16 |
| 9,227,240 | B2 | * | 1/2016 | MacAdams | B25F 3/00 |
| 9,272,477 | B2 | * | 3/2016 | Kasai | H01R 43/042 |
| 9,352,429 | B2 | * | 5/2016 | Gottschaldt | B21D 39/048 |
| 2001/0013243 | A1 | | 8/2001 | Amherd | |
| 2008/0069663 | A1 | | 3/2008 | Frenken et al. | |
| 2010/0275672 | A1 | | 11/2010 | Frenken | |
| 2014/0123724 | A1 | | 5/2014 | Frenken | |

FOREIGN PATENT DOCUMENTS

| | | | | |
|---|---|---|---|---|
| CN | 2467274 Y | | 12/2001 | |
| CN | 202713407 U | * | 1/2013 | .......... F01L 13/0031 |
| CN | 202713407 U | | 1/2013 | |
| CN | 206297484 U | | 7/2017 | |
| CN | 206795741 U | | 12/2017 | |
| DE | 10110882 A1 | * | 9/2002 | .............. B25F 5/005 |
| DE | 10110882 A1 | | 9/2002 | |
| JP | S57-142729 A | | 9/1982 | |
| JP | 2009523621 A | | 6/2009 | |
| JP | 2013-169573 A | | 9/2013 | |
| JP | 2017076477 A | | 4/2017 | |
| KR | 20-1996-0031612 U | | 10/1996 | |
| KR | 10-0935952 B1 | | 12/2009 | |
| KR | 10-1003978 B1 | | 12/2010 | |
| KR | 10-1416079 B1 | | 7/2014 | |

OTHER PUBLICATIONS

Extended European Search Report of corresponding Patent Application No. 19172496.2—8 pages (dated Oct. 7, 2019).

* cited by examiner

FIG. 17
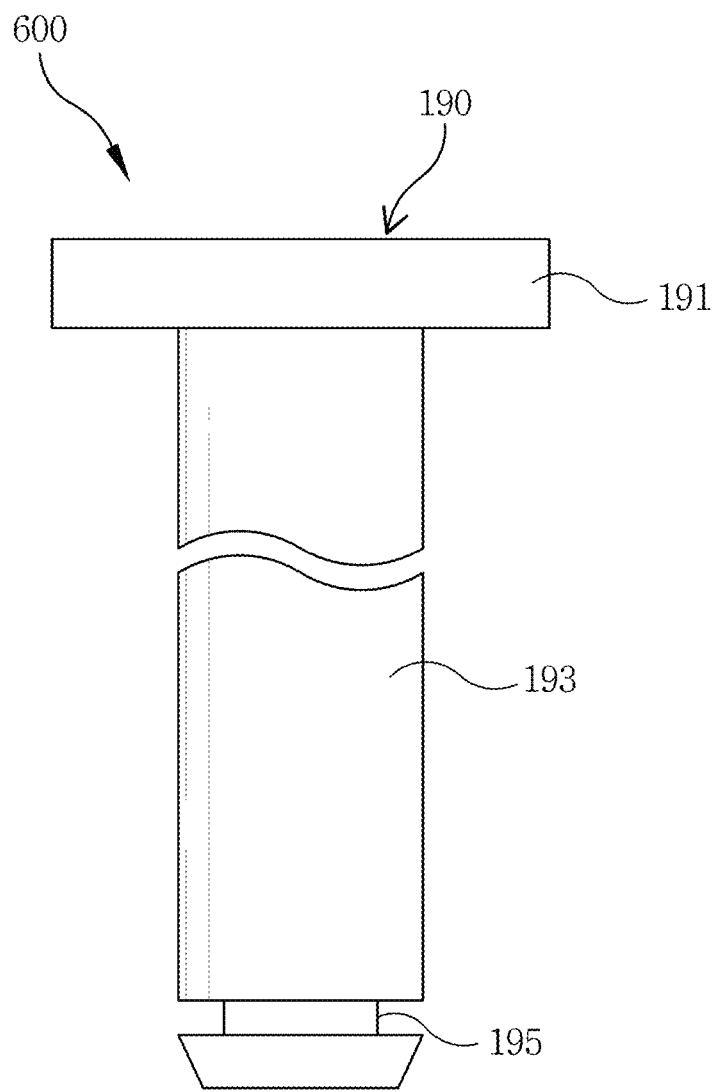
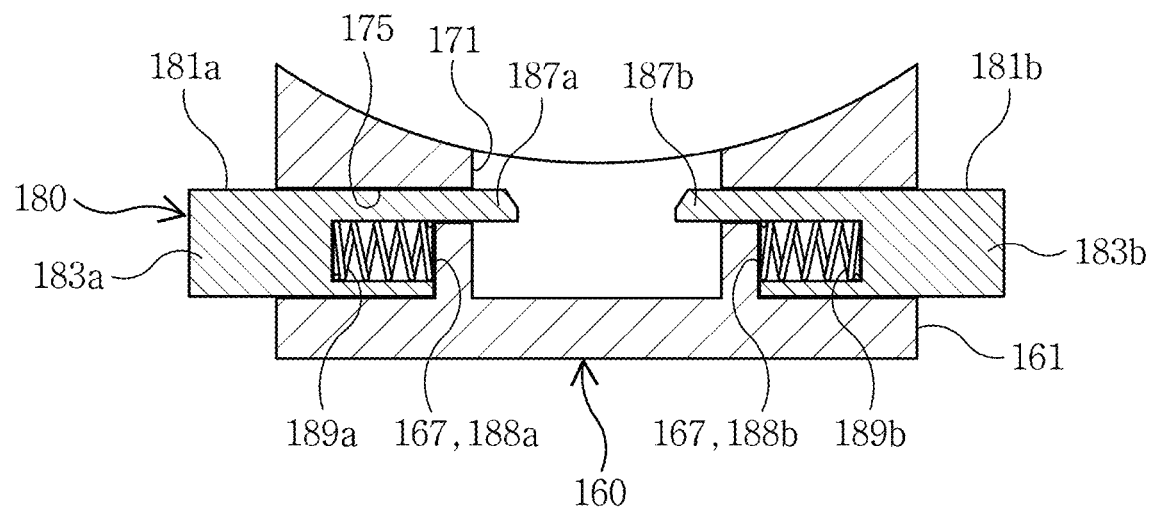

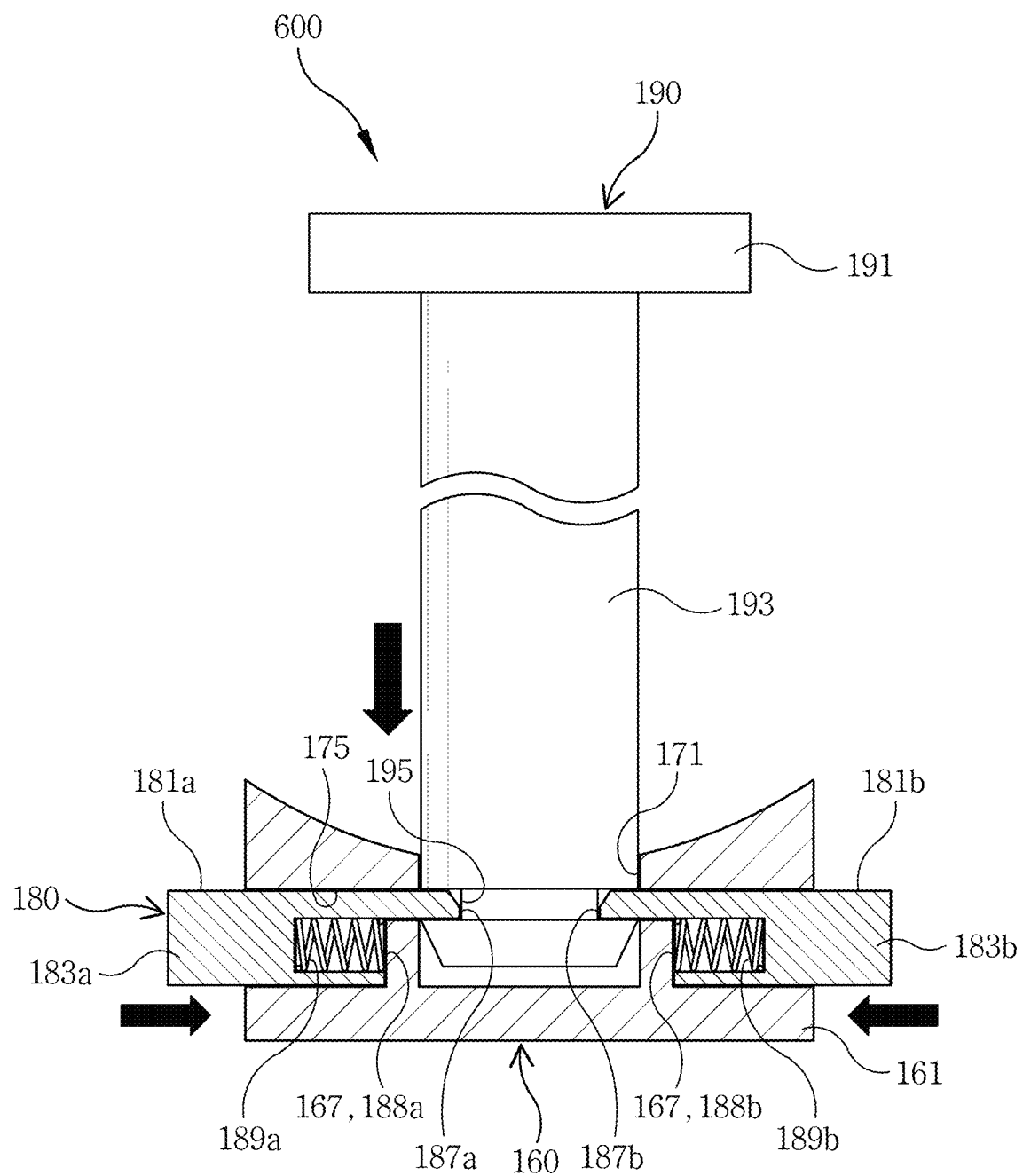

CONNECTING DEVICE AND PIPE PRESS-FIT CONNECTING APPARATUS USING THE SAME

CROSS-REFERENCE TO RELATED APPLICATION

The present application claims priority to Korean Patent Application No. 10-0051386, filed on May 3, 2018, in the Korean Intellectual Property Office, which is incorporated herein in its entirety by reference.

TECHNICAL FIELD

The present disclosure relates to a pipe connecting apparatus and, more particularly, to an apparatus for producing press-fit connection of pipes by physically pressing overlapping portions of pipes and a pipe fitting. Additionally, the present disclosure relates to a connecting device for use in the apparatus for producing press-fit connection of pipes.

BACKGROUND

Stainless steel pipes with high corrosion resistance are generally used as pipes in buildings or water mains. Installation of the pipes in buildings involves a connection of the pipes by a welding, a screw connection, a press-fit connection, or the like.

Among the connection methods, the press-fit connection uses a pipe connecting member such as a pipe fitting to connect the pipes conveniently and prevent a problem of breakaway of the connection or leakage of water. According to the pipe connection using the pipe fitting, ends of two pipes to be connected are introduced into an opening of the pipe fitting and the pipe fitting enclosing the ends of the pipes is pressed with a critical pressure to complete the connection.

A pipe press-fit connecting apparatus includes a pipe pressing unit suitable for pressing the pipe fitting and a pressing power providing unit suitable for providing a pressing power to the pipe pressing unit. Also, the pipe press-fit connecting apparatus may further include a pressing power delivery unit suitable for delivering the pressing power generated by the pressing power providing unit to the pipe pressing unit. That is, the pressing power providing unit is coupled to a connected unit such as the pipe pressing unit or the pressing power delivery unit for performing the pipe connection.

The pressing power providing unit includes a cylinder rod moving back and forth in a cylinder block. The connected unit may be connected to a leading end of the cylinder block by a pin. The cylinder rod moves forward along the cylinder block to transfer the pressing force to the connected unit connected to the cylinder block.

The power providing unit may be formed with a guide hole in the cylinder block to allow the movement of cylinder rod. An opening is formed on both sides of the guide hole so that the connected unit can be coupled to the cylinder block and operate together. That is, the cylinder block has a shape divided into a first and second guide blocks.

Since the first and second guide blocks are spaced apart from each other by a certain spacing, and the connected unit is connected to the first and second guide blocks with a pin coupling, leading end portion of the first and second guide blocks are subjected to mechanical stress as the pipe connecting processes repeatedly carried out. Such a mechanical stress increases a clearance between the first and second guide blocks, which may cause a problem that the cylinder rod cannot stably provide the pressing power to the connected unit.

Furthermore, the increase in the clearance between the first and second guide blocks and the load of the connected unit may damage the first or second guide blocks may be damaged.

SUMMARY

In order to solve this problem, it may be contemplated to change the pin fitting into to a screw-nut engagement. However, the screw-nut engagement is time-consuming and the nut which is generally smaller than the screw is prone to be lost.

Further, in the process of fastening the nut to the screw, the clearance between the first and second guide blocks may be narrowed by the tightening force exerted on the cylinder block, thereby preventing the movement of the cylinder rod and stable delivery of the pressing power to the connected unit.

The present disclosure provides a connecting device capable of stably coupling and detaching a connected unit to and from to a pressing power providing unit, and pipe press-fit connecting apparatus employing the connecting device.

Also, the present disclosure provides a connecting device that can simplify the coupling between a pressing power providing unit and a connected unit, and pipe press-fit connecting apparatus employing the connecting device.

According to an aspect of an exemplary embodiment, the present disclosure provides a pipe press-fit connecting apparatus. The pipe press-fit connecting apparatus includes: a pressing power providing unit comprising a cylinder body, a cylinder rod having one end coupled to the cylinder body to move back and forth, and a cylinder block having one end coupled to the cylinder body and formed with a guide slit for guiding a movement of the cylinder rod and an installation hole formed near another end and extending in a direction perpendicular to a movement path of the cylinder rod; a connected unit having a coupling piece being inserted into the guide slit of the pressing power providing unit and formed with an insertion hole communicating with the installation hole; and a connecting device configured to align the installation hole of the pressing power providing unit and the insertion hole of the connected unit and couple the connected unit to the pressing power providing unit.

The connecting device includes: a fastener installed at one end of the installation hole on an exterior surface of the cylinder block and having a fastening pin configured to be resiliently arranged and at least partially be exposed to the installation hole; and a coupling pin inserted through the installation hole and the insertion hole through another end of the installation hole on the exterior surface of the cylinder block to be resiliently coupled to the fastening pin to couple the connected unit to the pressing power providing unit.

The fastener may include: a fastener body installed at one end of the installation hole on the exterior surface of the cylinder block and configured to guide a movement of the fastening pin; and the fastening pin resiliently installed in the fastener body and exposed at least partially to the installation hole.

The fastening pin may be divided into a plurality of pins, resiliently coupled to the coupling pin inserted through the installation hole, and detached from the coupling pin by an external force.

The fastening pin may include: a first fastening pin; a second fastening pin disposed such that the first and second fastening pins face each other; and an elastic member disposed between the first and second fastening pins to maintain a spacing between the first and second fastening pins. The coupling pin may be formed with a pin receiving recess, on a bottom surface of a tail, suitable for receiving and fixing some portion of the first and second fastening pins.

The first fastening pin may include: a first engagement portion capable of being detachably attached to the pin receiving recess of the coupling pin; and a first pushing portion extending outwards from the first engagement portion, The second fastening pin may include: a second engagement portion capable of being detachably attached to the pin receiving recess of the coupling pin and facing the first engagement portion with an intervention of the elastic member therebetween; and a second pushing portion extending outwards from the second engagement portion toward a direction opposite to the first pushing portion.

When the fastener is to be engaged with the coupling pin, the coupling pin is moved toward the first and second engagement portions so that the tail of the coupling pin presses the first and second engagement portions, the elastic member is compressed, the first and second engagement portions are brought close and inserted into the pin receiving recess of the coupling pin, and then the first and second engagement portions are separated from each other by a restoring force of the elastic member and fixed within the pin receiving recess of the coupling pin.

When the fastener is to be detached from the coupling pin, the first and second pushing portions are brought close by a pressing of the first and second pushing portions so that the coupling pin is unlocked and retracted from the first and second engagement portions, and then the first and second engagement portions are separated from each other by the restoring force of the elastic member when the external force is removed.

The coupling pin may include: a head configured to be brought into close contact another end of the installation hole on the exterior surface of the cylinder block; and a shaft integrally formed with the head, inserted into the installation hole to be coupled to the first and second fastening pins, and having the pin receiving recess on the bottom surface of the tail.

The fastener body may include: a lower body having a first guide groove formed on an upper surface thereof and configured to guide the movement of the first and second pushing portions; and a upper body having a lower surface fixed to the upper surface of the lower body and an upper surface fixed to an the outer surface of the cylinder block, and formed with a second guide groove on the lower surface corresponding to the first guide groove to guide the movement of the first and second pushing portions and a pin passage hole penetrating the lower surface and the upper surface and communicating with the installation hole. The first and second engagement portions are exposed at least partially through the pin passage hole, and the coupling pin is inserted through the pin passage hole.

The fastening pin may include: a first fastening pin installed on the fastener body to be movable elastically in a direction perpendicular to a direction in which the coupling pin is inserted; and a second fastening pin installed on the fastener body to be movable elastically in the direction perpendicular to the direction in which the coupling pin is inserted, arranged to face the first fastening pin, and spaced apart from the first fastening pin by a predetermined spacing.

The coupling pin is formed with a pin receiving recess, on a lateral surface of a tail, suitable for receiving and fixing some portion of the first and second fastening pins.

When the fastener is to be engaged with the coupling pin, the coupling pin is inserted between the first and second engagement portions so that the first and second engagement portions are elastically retracted, and the first and second engagement portions are partially inserted into the pin receiving recess of the coupling pin to lock the coupling pin when the coupling pin is moved further to face the ends of the first and second engagement portions. When the fastener is to be detached from the coupling pin, the first and second pushing portions are retracted from the pin receiving recess and the coupling pin is separated from the first and second fastening pins, and then the first and second fastening pins returns to original positions an external force is removed.

The coupling pin may include: a head configured to be brought into close contact another end of the installation hole on the exterior surface of the cylinder block; and a shaft integrally formed with the head, inserted into the installation hole to be coupled to the first and second fastening pins, and having the pin receiving recess on the bottom surface of the tail.

According to another aspect of an exemplary embodiment, the present disclosure provides a connecting device for coupling a connected unit to a pressing power providing unit through an installation hole formed in a cylinder block of the pressing power providing unit and an insertion hole of the connected unit. The connecting device includes: a fastener installed at one end of the installation hole on an exterior surface of the cylinder block and having a fastening pin configured to be resiliently arranged and at least partially be exposed to the installation hole; and a coupling pin inserted through the installation hole and the insertion hole through another end of the installation hole on the exterior surface of the cylinder block to be resiliently coupled to the fastening pin to couple the connected unit to the pressing power providing unit.

According to the present disclosure, a connected unit may be fixed to or separated from a pressing power providing unit by installing a fastener operable by a one-touch manipulation on one side of a cylinder block of a pressing power providing unit, and inserting or retracting a coupling pin to or from the fastener through an opposite side of the cylinder block.

Since the connecting device can fix or separate the connected unit to or from the pressing power providing unit by the one-touch manipulation, the connection can be secured stably and the connecting process is much simplified.

The connecting device according to the present disclosure can solve the problem of the increase in the clearance between the first and second guide blocks connected to the connected unit due to the mechanical stress. Therefore, the present disclosure may reduce the breakage of the first or second guide blocks.

BRIEF DESCRIPTION OF THE DRAWINGS

In order that the disclosure may be well understood, there will now be described various forms thereof, given by way of example, reference being made to the accompanying drawings.

FIG. 17 is a cross-sectional view of a connecting device according to a second embodiment of the present disclosure.

FIGS. 18 and 19 are cross-sectional views illustrating a process of engaging the coupling pin to a fastening pin of the fastener.

Figure 1:
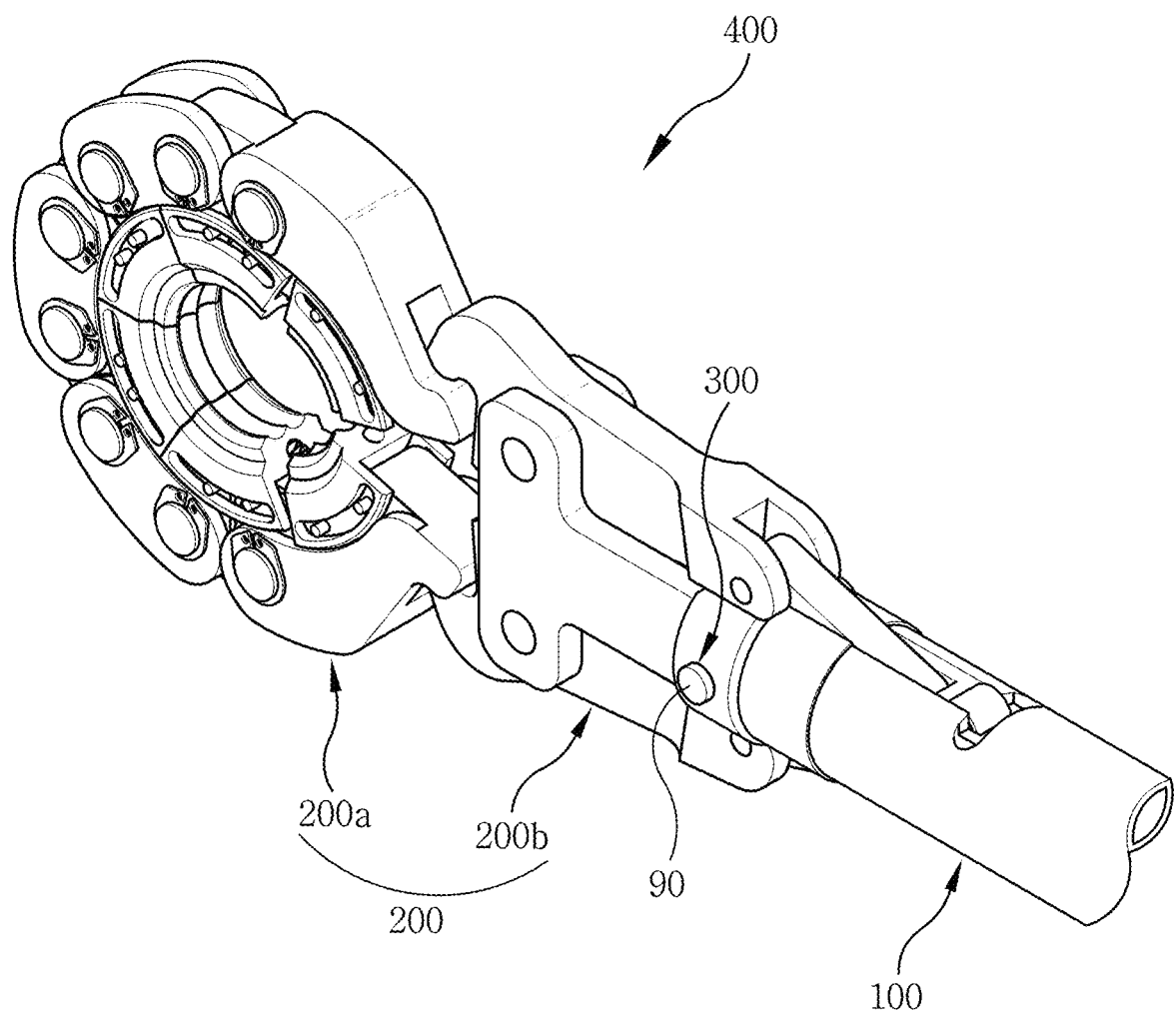
FIG. 1 is a perspective view of an exemplary pipe press-fit connecting apparatus using a connecting device according to a first embodiment of the present disclosure.

The drawings described herein are for illustration purposes only and are not intended to limit the scope of the present disclosure in any way.

DETAILED DESCRIPTION

In the following description and the accompanied drawings, detailed descriptions of well-known functions or configuration that may obscure the subject matter of the present disclosure will be omitted for simplicity.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

First Embodiment

FIG. 1 is a perspective view of an exemplary pipe press-fit connecting apparatus using a connecting device according to a first embodiment of the present disclosure.

Referring to FIG. 1, a pipe press-fit connecting apparatus 400 includes a pipe pressing unit 200a, pressing power delivery unit 200b, and a pressing power providing unit 100, and has a structure that the pipe pressing unit 200a is connected to the pressing power providing unit 100 via the pressing power delivery unit 200b. In a general aspect, a connecting device 300 according to the present disclosure couples a unit 200 (hereinbelow, referred to as "connected unit") that needs to be connected to a particular device (e.g., the pressing power providing unit 100) to the particular device. Since the pressing power delivery unit 200b coupled with the pipe pressing unit 200a is coupled to the pressing power providing unit 100 by the connecting device 300, the pipe pressing unit 200a and the pressing power delivery unit 200b play the role of the connected unit 200. The connecting device 300 can connect or disconnect the pressing power delivery unit 200b to and from the pressing power providing unit 100 by a one-touch manipulation.

In the example depicted in FIG. 1, the pipe press-fit connecting apparatus 400 includes the pressing power delivery unit 200b transferring the pressing power from the pressing power providing unit 100 to the pipe pressing unit 200a separately from the pipe pressing unit 200a configured to press the pipes. In the present embodiment, the pipe pressing unit 200a may employ a chain type jaw and the pressing power delivery unit 200b may be implemented by a chain type clamping unit.

Figure 2:
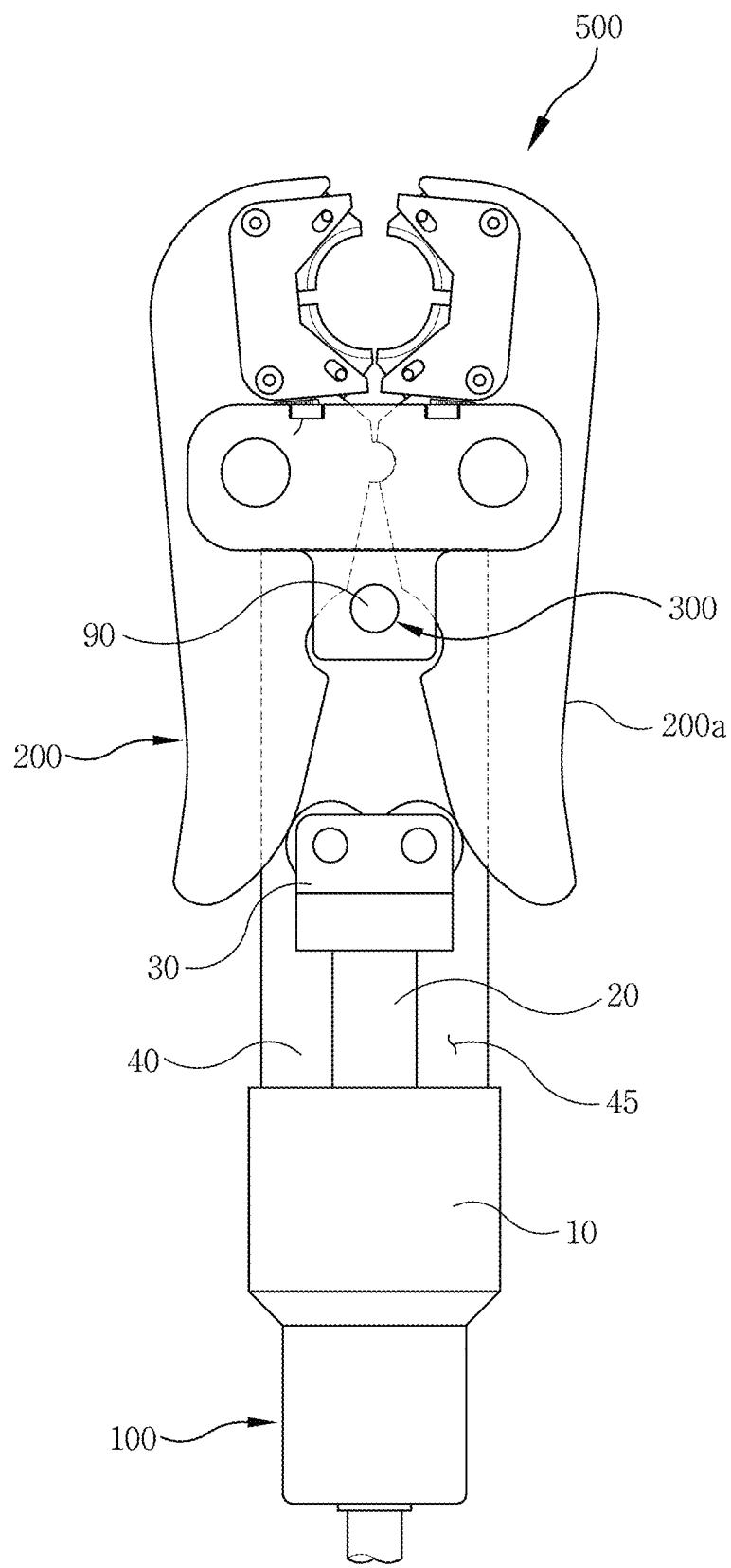
FIG. 2 is a perspective view of another exemplary pipe press-fit connecting apparatus using the connecting device according to a first embodiment of the present disclosure.

FIG. 2 is a perspective view of another exemplary pipe press-fit connecting apparatus using the connecting device 300 according to the first embodiment of the present disclosure.

Referring to FIG. 2, a pipe press-fit connecting apparatus 500 has a structure that the pressing power providing unit 100 is directly coupled to the pipe pressing unit 200a. Thus, in this example, the pipe pressing unit 200a plays the role of the connected unit 200 which is coupled to the pressing power providing unit 100 by the connecting device 300. The connecting device 300 can connect or disconnect the pipe pressing unit 200a to and from the pressing power providing unit 100 by the one-touch manipulation.

In the example depicted in FIG. 2, the pipe pressing unit 200a includes both pipe pressing members and pressing power delivery members for receiving the pressing power from the pressing power providing unit 100. In the present embodiment, the pipe pressing unit 200a may be implemented by hinge-type jaws.

Figure 3:
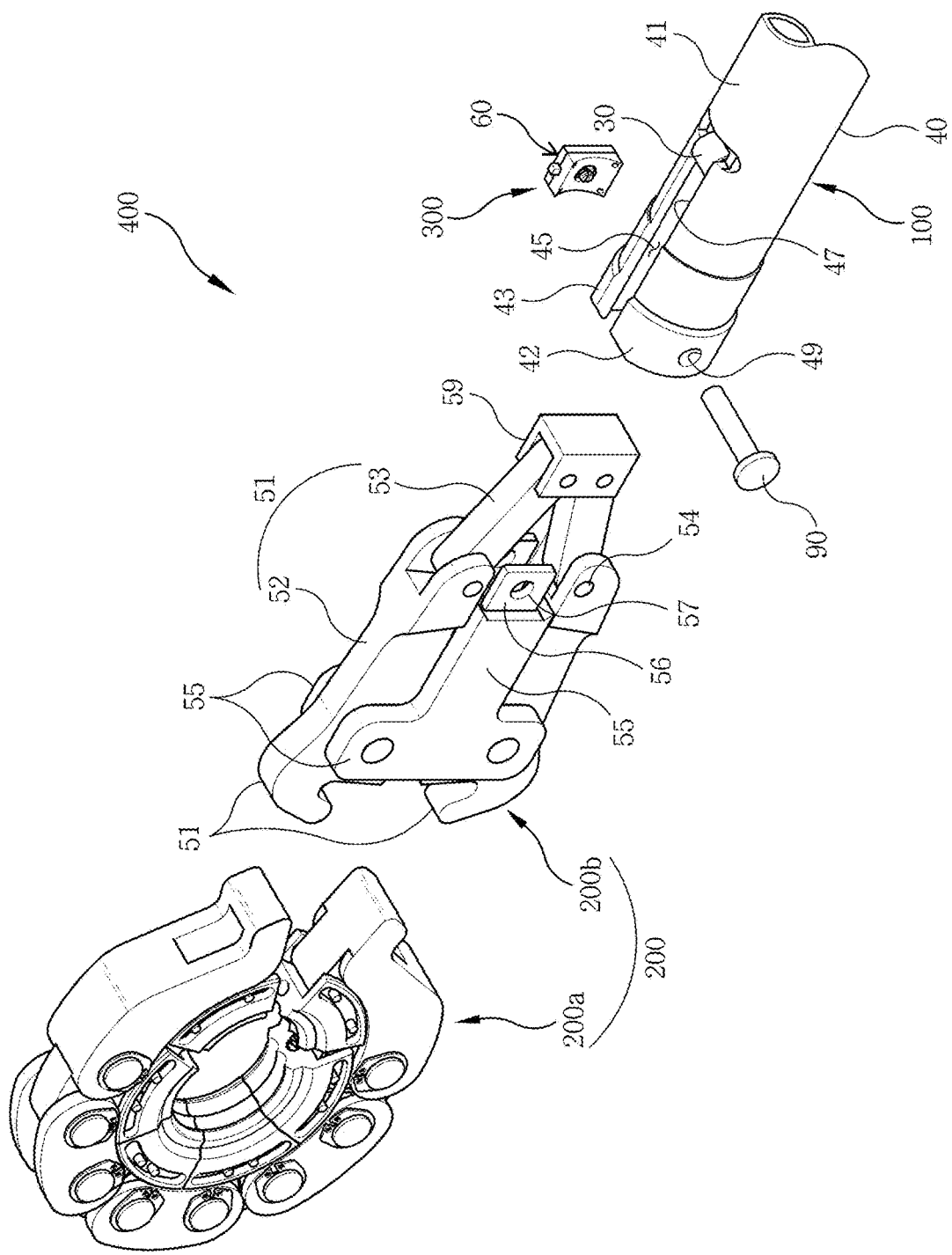
FIG. 3 is a partially exploded view of the pipe press-fit connecting apparatus shown in FIG. 1.
Figure 4:
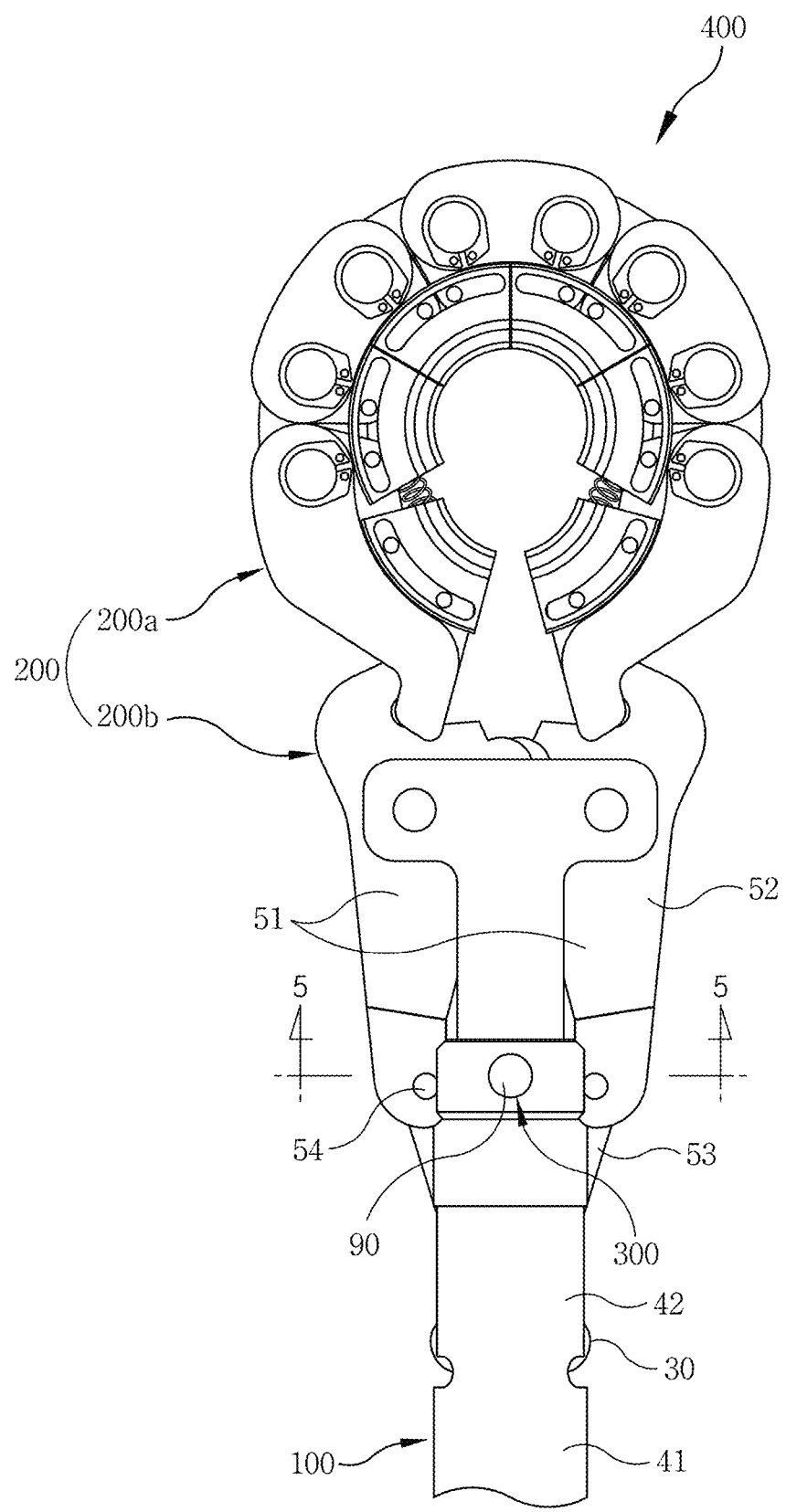
FIG. 4 is a plan view of the pipe press-fit connecting apparatus shown in FIG. 1.
Figure 5:
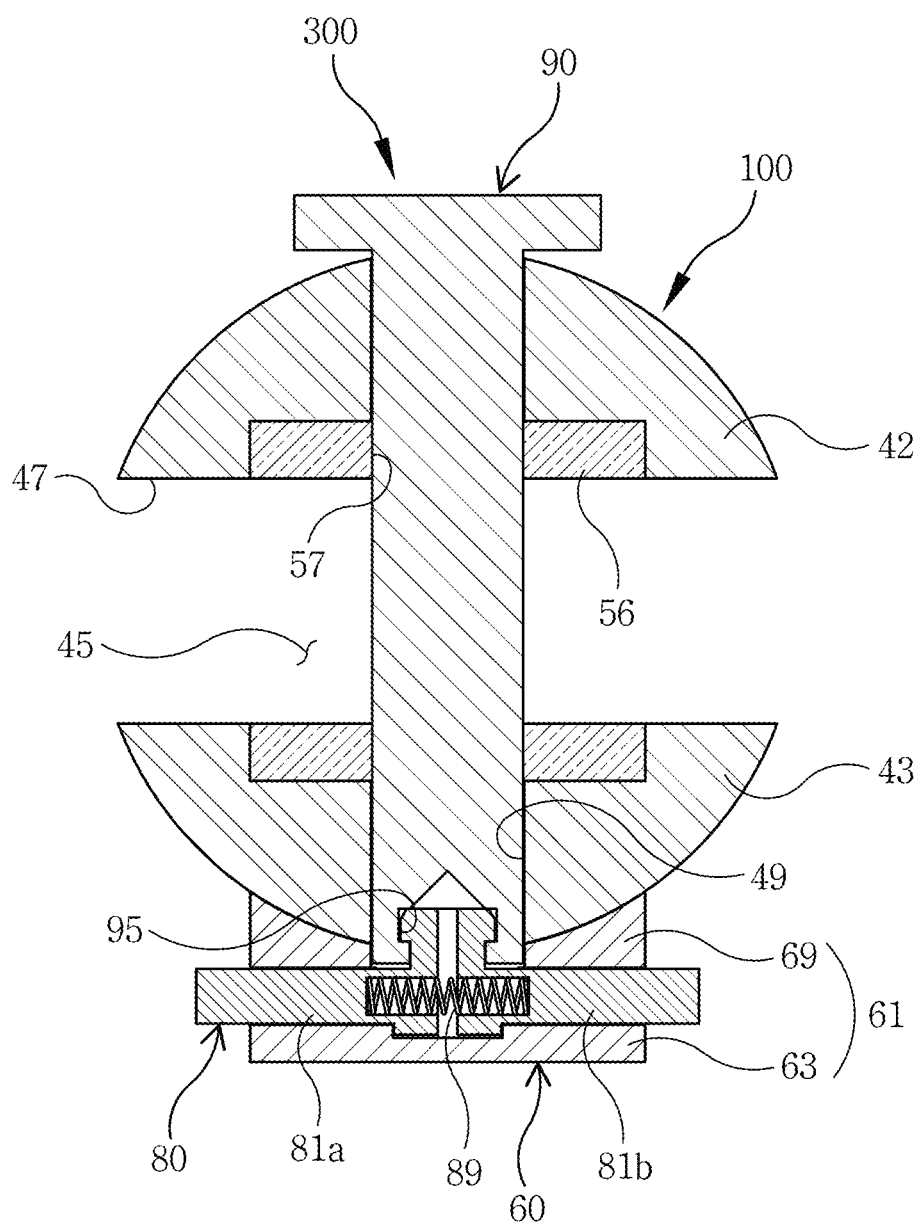
FIG. 5 is a cross-sectional view taken along a 5-5 line in FIG. 4.

The pipe press-fit connecting apparatus 400 according to the first embodiment will now be described in detail with reference to FIGS. 3-5. FIG. 3 is a partially exploded view of the pipe press-fit connecting apparatus 400 according to the first embodiment, FIG. 4 is a plan view of the pipe press-fit connecting apparatus 400, and FIG. 5 is a cross-sectional view taken along a 5-5 line in FIG. 4. In the embodiment depicted in the drawings, the connected unit 200 is the pipe pressing unit 200a and the pressing power delivery unit 200b, and the pressing power delivery unit 200b is coupled to the pressing power providing unit 100 by the connecting device 300. In the pressing power delivery unit 200b shown in FIGS. 3-5, a cylinder body coupled to a cylinder block 40 is omitted for simplicity. Meanwhile, since the pressing power providing unit 100 is similar to the pressing power providing unit 100 shown in FIG. 2, the pressing power providing unit 100 will be described with reference to FIG. 2 additionally.

The pipe press-fit connecting apparatus 400 according to the first embodiment includes the pressing power providing unit 100, the connected unit 200, and the connecting device 300. The connecting device 300 includes a fastener 60 and a coupling pin 90.

The pressing power providing unit 100 includes a cylinder body 10, a cylinder rod 20, and a cylinder block 40.

The cylinder rod 20 is connected to one end of the cylinder body 10 and moves back and forth. The cylinder block 40 is connected to one end of the cylinder body 10, and has a guide slit 45 penetrating the cylinder block 40 horizontally and extending along a moving path of the cylinder rod 20. Near the other end of the cylinder block 40, an installation hole 49 for receiving the coupling pin 90 of the connecting device 300 is formed perpendicularly to moving path of the cylinder rod 20.

The connected unit 200 has a coupling piece 56 inserted into the guide slit 45 of the pressing power providing unit 100 and having an insertion hole 57 communicating with the installation hole 49.

The coupling pin 90 of the connecting device 300 is inserted into the installation hole 49 of the pressing power providing unit 100 in a state that the insertion hole 57 of the connected unit 200 is aligned to the installation hole 49. The fastener 60 is installed at one end of the installation hole 49 on an exterior surface of the cylinder block 40 such that a fastening pin 80 is partially exposed to the installation hole 49. The coupling pin 90 is inserted into the installation hole 49 and the insertion hole 57 from the outer surface of the cylinder block 40 opposite to the fastener 60 and resiliently coupled to the fastening pin 80 to couple the connected unit 200 to the pressing power providing unit 100.

The pressing power providing unit 100 provides the pressing power to the connected unit 200 through the cylinder rod 20. The pressing power providing unit 100 may further include a roller block 30 in addition to the cylinder body 10, the cylinder rod 20, and the cylinder block 40.

The cylinder body 10 provides an actuating force to move the cylinder rod 20 back and forth.

The cylinder block 40 is secured to one side of the cylinder body 10 and to couple the cylinder body 10 to the pressing power delivery unit 200b. The cylinder block 40 is formed with the guide slit 45 through which the cylinder rod 20 can move. The guide slit 45 is open to both sides, and thus an opening 47 is formed at both sides of the cylinder block 40. The installation hole 49 is formed neat the other end of the cylinder block 40.

The cylinder block 40 has a connecting block 41 coupled to the cylinder body 10 and a pair of guide blocks 42 and 43 formed integrally with the connecting block 41 and split by the guide slit 34. Thus, the guide slit 45 is located between the guide blocks 42 and 43 for allowing the movement of the cylinder rod 20, and the guide slit 45 communicates with the openings 47 at both sides.

The pair of a first guide block 42 and a second guide block 43 is formed with the installation hole 49 near the other end of the cylinder block 40 opposite to the coupling block 41. The installation hole 49 is formed in a direction perpendicular to the direction along which the cylinder rod 40 moves, that is, in a direction perpendicular to the direction in which the guide slit 45 is elongated. The installation hole 49 is in communications with the guide slit 45. The fastener 60 may be provided on the outer surface of the second guide block 43 and the coupling pin 90 may be inserted into the installation hole 49 formed in the first guide block 42.

The cylinder rod 20 protrudes to one side of the cylinder body 10 and extends along the guide slit 45 of the cylinder block 40 as the cylinder body 10 is driven to provide pressing power to the pressing power delivery unit 200b.

The roller block 30 is installed at a leading end of the cylinder rod 20 and provides the pressing power to the pressing power delivery unit 200b as the extension of the cylinder rod 20.

The pressing power delivery unit 200b has a structure that a pair of clamps 51 having a link segment 53 are connected by a pair of link plates 55.

A pair of clamps 51 pivot about the pair of link plates 55 to provide pressing power to the pipe pressing unit 200a. The pair of clamps 51 include a pair of jaws 52 and a pair of link segments 53. A pair of jaw segments 52 is coupled to the link plate 55 and rotates in opposite directions to provide the pressing power to the pipe pressing unit 200a. One ends of the link segments 53 are coupled to the pair of jaw segments 52 by the links 54 and the other ends of the link segments 53 are connected to each other via a coupling block 59. The coupling block 59 contacts the roller block 30 at the leading end of the cylinder rod 20 of the pressing power providing unit 100 to be driven linearly.

The pair of link plates 55 is formed with the coupling piece 56 coupled to the cylinder block 40. The coupling piece 56 has the insertion hole 57 to be aligned with the installation hole 49.

In the pressing power delivery unit 200b, the pair of link segments 53 coupled to the coupling block 59 may be located at the leading end of the cylinder rod 20 through the openings 47 of the pair of guide blocks 42 and 43. According to the forward and backward movement of the cylinder rod 20 through the guide slit 45, the pair of link segments 53 moves in through the opening 47 to provide the pressing power to the pipe pressing unit 200a or release the delivery of the power.

The connecting device 300 couples the pressing power providing unit 100 to the pressing power delivery unit 200b. The connecting device 300 includes the fastener 60 installed on the cylinder block 40 and the coupling pin 90 that is coupled to the fastener 60.

The fastener 60 is installed on the outer surface of the cylinder block 40 to cover one end of the installation hole 49. The fastening pin 80 of the fastener 60 may be partially exposed toward the installation hole 49. The fastening pin 80 may be located lower than an internal surface of the guide slit 45 of the cylinder block 40 to prevent mechanical interference with the coupling piece 56 of the link plate 55 of the pressing power delivery unit 200b. That is, some portion of the fastening pin 80 may be located within the installation hole 49 of the cylinder block 40, which is described below in detail.

The coupling pin 90 is formed with a pin receiving recess 95 at its tail, which can be coupled to the fastening pin 80 of the fastener 60. The pin receiving recess 95 may be formed on a bottom surface or a lateral surface of the tail depending on a coupling scheme of the coupling pin 90 and the fastening pin 80.

The connection between the pressing power providing unit 100 and the pressing power delivery unit 200b may be accomplished as follows using the connecting device 300. First, the coupling piece 56 of the link plate 55 of the pressing power delivery unit 200b is inserted into the other end of the cylinder block 40 of the pressing power providing unit 100. In a state that the insertion hole 57 of the coupling piece 56 is aligned with the installation hole 49 of the cylinder block 40, the coupling pin 90 is inserted to the installation hole 49 at an entrance opposite to the fastener 60 and engaged with the fastener 60 to complete the connection between the pressing power providing unit 100 and the pressing power delivery unit 200b. Here, the coupling pin 90 is coupled to the fastening pin 80 of the fastener 60 to resiliently fix and support the fastening pin 80.

When the pressing power providing unit 100 is to be separated from the pressing power delivery unit 200b connected by the connecting device 300, an external force is applied to the fastening pin 80 to release the resilient coupling between the coupling pin 90 and the fastening pin 80 of the fastener 60. Then the coupling pin 90 is retracted from the fastener 60, so that the pressing power delivery unit 200b can separated from the pressing power providing unit 100.

Figure 6:
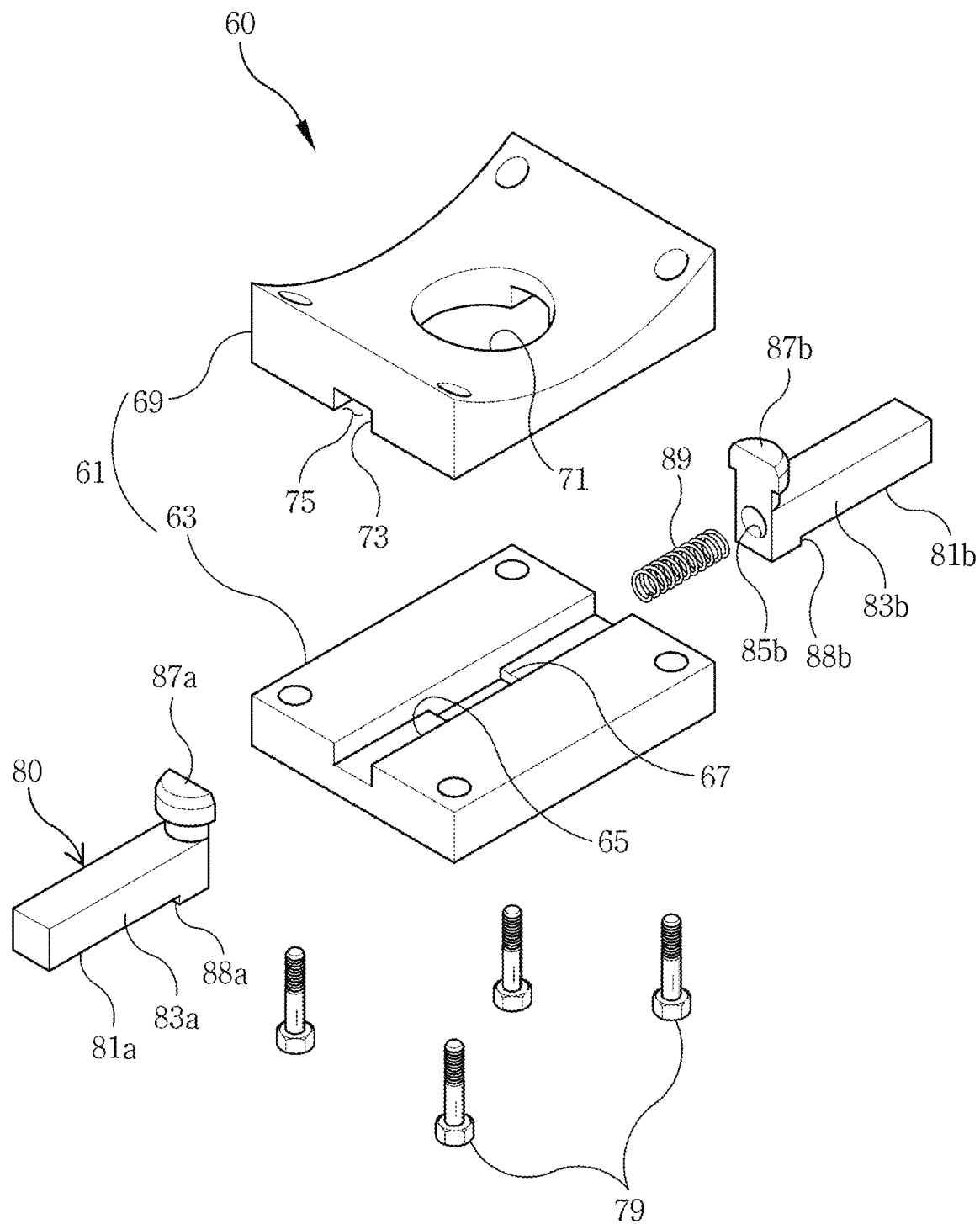
FIG. 6 is an exploded view of a connecting device shown in FIG. 3.
Figure 7:
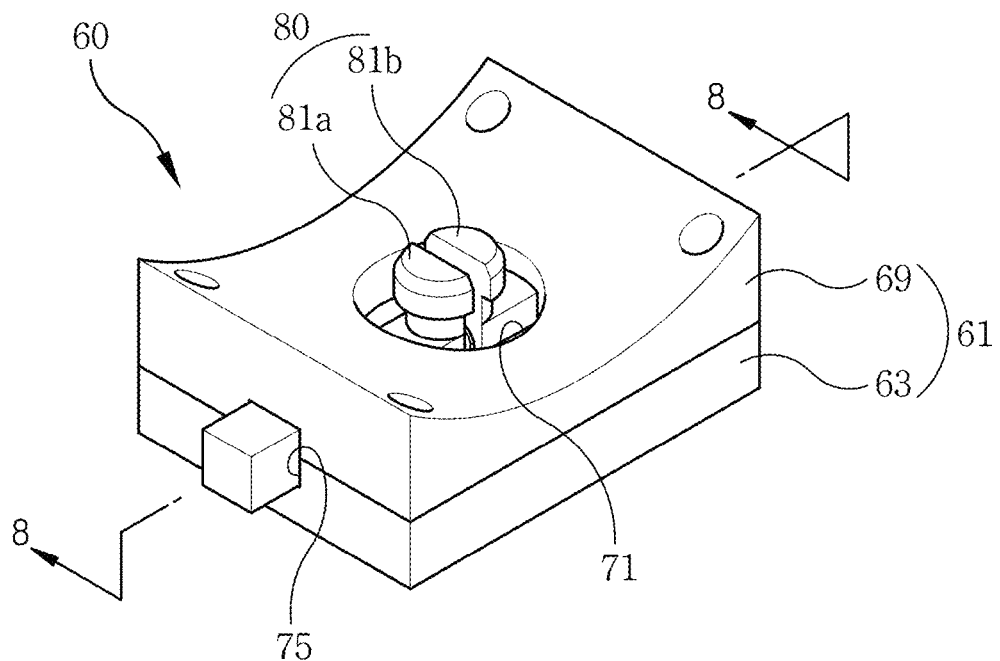
FIG. 7 is a perspective view of the connecting device of FIG. 6.
Figure 8:
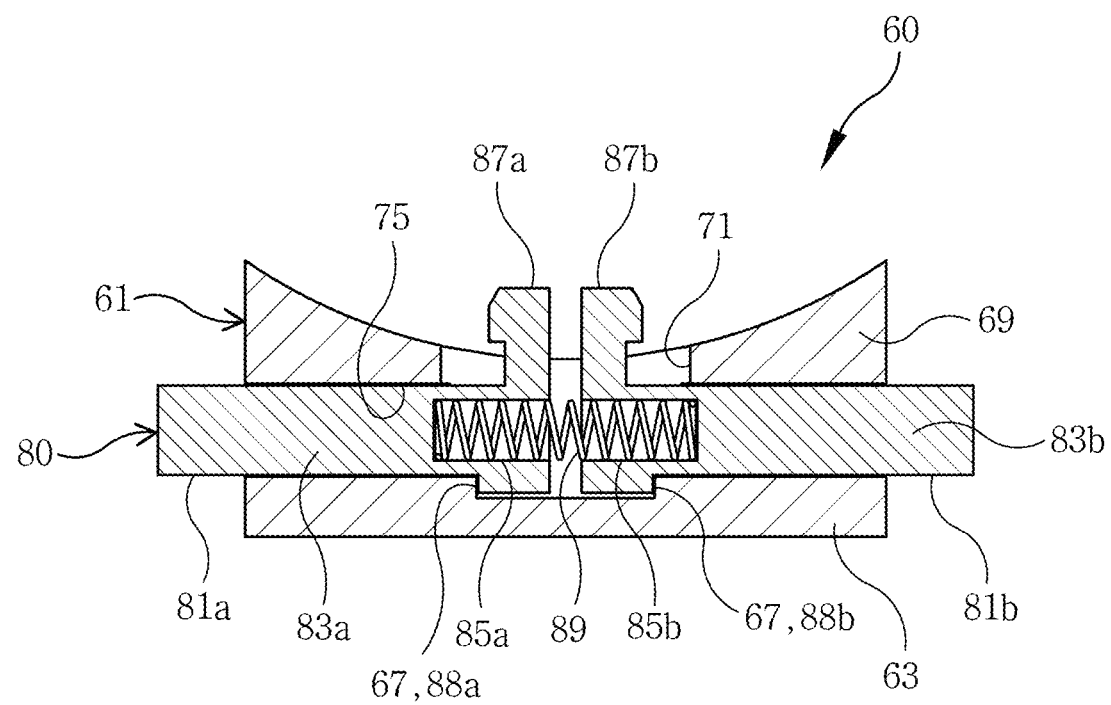
FIG. 8 is a cross-sectional view taken along an 8-8 line in FIG. 7.
Figure 9:
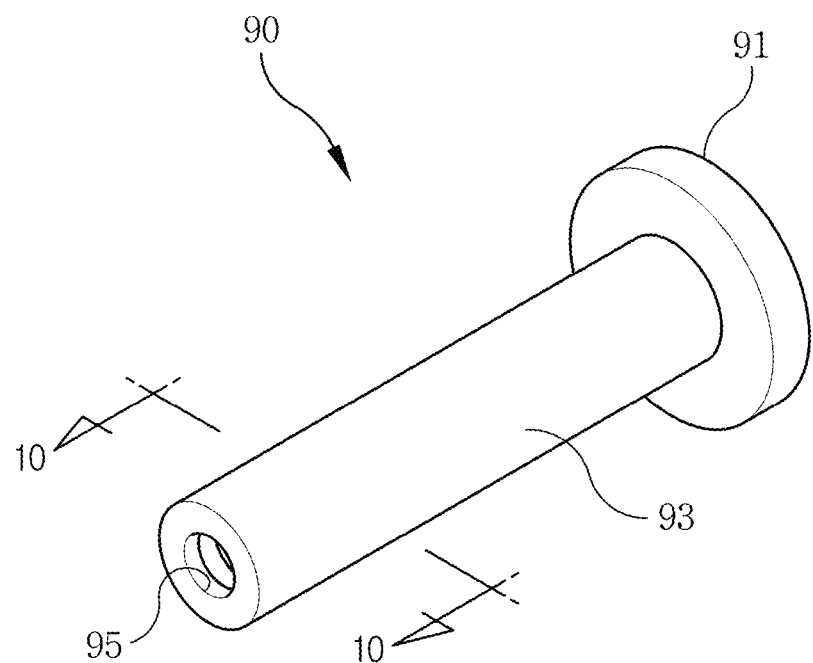
FIG. 9 is a perspective view of a coupling pin in a connecting device shown in FIG. 3.
Figure 10:
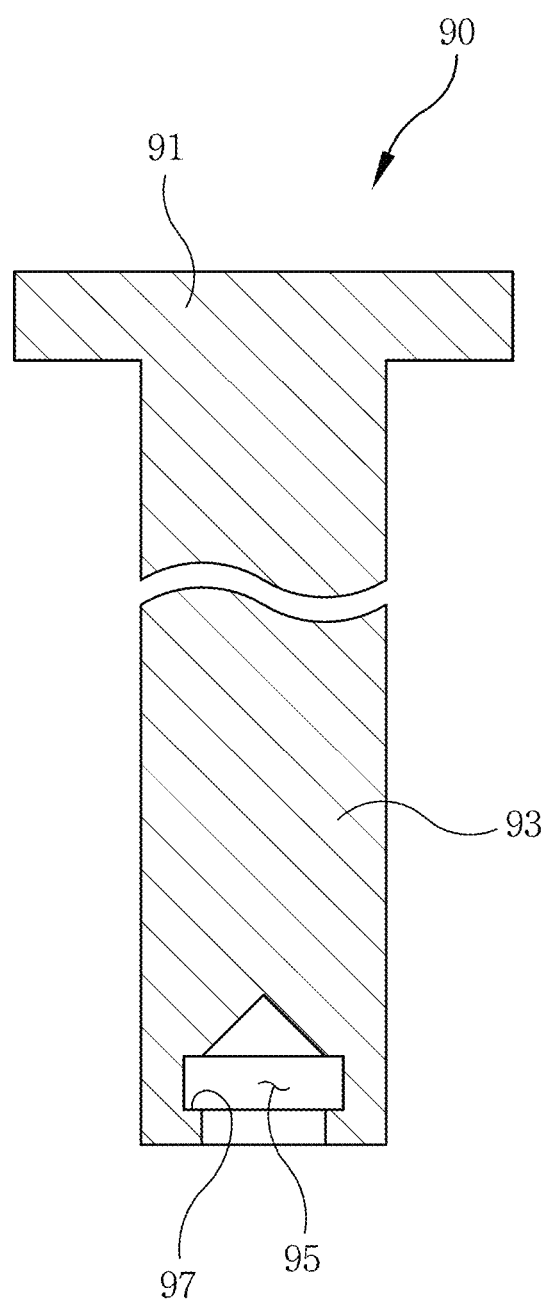
FIG. 10 is a cross-sectional view taken along a 10-10 line in FIG. 9.

The connecting device 300 according to the first embodiment will now be described in detail with reference to FIGS. 6-10. FIGS. 6 through 8 illustrate the fastener 60 of the connecting device 300, and FIGS. 9 and 10 illustrate the coupling pin 90 of the connecting device 300.

Referring to FIGS. 6-8, the fastener 60 includes a fastener body 61 and the fastening pin 80. The fastener body 61 is installed at one end of the installation hole 49 on an exterior surface of the cylinder block and guides a movement of the fastening pin 80. The fastening pin 80 is installed in the fastener body 61 to be movable elastically and is partially exposed to the installation hole 49.

The fastening pin 80 includes a first fastening pin 81a, a second fastening pin 81b, and a spring 89 disposed between the first and second fastening pins 81a and 81b. The spring 89 is disposed between the first and second fastening pins 81a and 81b and can maintain a spacing between the first and second fastening pins 81a and 81b.

The first and second fastening pins 81a and 81b have the same shape. The first fastening pin 81a has a first engagement portion 87a and a first pushing portion 83a, and the second fastening pin 81b has a second engagement portion 87b and a second pushing portion 83b. The first and second engagement portion 87a and 87b are disposed to face each other with the spring 89 therebetween, and can be resiliently coupled to the coupling pin 90 inserted into the installation hole 49 and separated from the coupling pin 90 by an external force. The first and second pushing portions 83a and 83b extends from the first and second engagement portions 87a and 87b, respectively, to an outer surface of the fastener body 61 oppositely to each other.

The first and second engagement portion 87a and 87b are formed to protrude vertically from inner ends of the first and second pushing portions 83a and 83b, respectively. Accordingly, the first and second fastening pins 81a and 81b are L-shaped. The first and second engagement portion 87a and 87b may be shorter than the first and second pushing portions 83a and 83b. Edges of upper ends of the first and second engagement portion 87a and 87b are tapered so as to be pushed into the pin receiving recess 95 of the coupling pin 90. Below the tapered portions, the first and second engagement portions 87a and 87b are formed with coupling jaws that can be inserted into and engaged with the pin receiving recess 95 of the coupling pin 90.

The first and second pushing portions 83a and 83b are formed with a first and second steps 88a and 88b, respectively, on their lower surfaces so as to restrain strokes of horizontal linear motions of the first and second engagement portions 87a and 87b. In the first embodiment shown in the drawings, the first and second steps 88a and 88b are provided by forming the thickness of the first and second pushing portions 83a and 83b where the first and second engagement portions 87a and 87b are formed to be thicker than the other portions.

The first and second pushing portions 83a and 83b are formed with first and second spring insertion recesses 85a and 85b, respectively, suitable for receiving respective ends of the spring 89.

One end of the spring 89 is inserted into the first spring insertion recess 85a and the other end of the spring 89 is inserted into the second spring insertion recess 85b. The first and second fastening pins 81a and 81b are elastically spaced apart due to the spring 89. When the first and second fastening pins 81a and 81b are brought close to each other by an external force, the spring 89 is compressed. If the external force is removed, the spring 89 restores its original length and returns the first and second fastening pins 81a and 81b to recover their original spacing.

The external force exerted on the first and second fastening pins 81a and 81b may be applied to the first and second engagement portions 87a and 87b or to the first and second pushing portions 83a and 83b. The external force may be applied to the first and second engagement portions 87a and 87b when the coupling pin 90 is being coupled to the first and second fastening pins 81a and 81b, for example. The external force may be applied to the first and second pushing portions 83a and 83b when the coupling pin 90 is to be separated from the first and second fastening pins 81a and 81b, for example.

The fastener body 61 is a frame for installing the first and second fastening pins 81a and 81b in the cylinder block. The fastener body 61 has a pin guide groove 75 formed to extend from one side to the opposite side of the fastener body 61 for guiding the movement of the first and second fastening pins 81a and 81b. Also, the fastener body 61 has a pin passage hole 71 that allows the pin guide groove 75 to communicate with the installation hole 49 formed in the cylinder block. Thus, the first and second engagement portions 87a and 87b to be coupled to the coupling pin 90 can be exposed above the pin passage hole 71.

The fastener body 61 includes a lower body 63 and an upper body 69. The lower body 63 has a first guide groove 65 on its upper surface for guiding the movement of the first and second pushing portions 83a and 83b. The upper body 69 has a lower surface fixedly installed on the upper surface of the lower body 63 and an upper surface fixedly attached to the outer surface of the cylinder block. The upper body 69 has a second guide groove 73 is formed on the lower surface to correspond to the first guide groove 65 for guiding the movement of the first and second pushing portions 83a and 83b. The pin passage hole 71 is formed to penetrate the upper body 69 vertically so that the installation hole 49 formed in the cylinder block to communicate with the second guide groove 73. The upper body 69 allows the first and second engagement portions 87a and 87b to be exposed through the pin passage hole 71 while allowing the coupling pin 90 to be inserted into the pin passage hole 71. The lower body 63 and the upper body 69 can be coupled by a plurality of fastening components 79.

The first guide groove 65 and the second guide groove 73 form the pin guide groove 75 in an assembled state.

Two hooking jaws 67 are formed on the bottom surface of the first guide groove 65 of the lower body 63 so as to correspond to the steps 88a and 88b of the first and second pushing portions 83a and 83b. The first and second fastening pins 81a and 81b are inserted into the pin guide groove 75 and installed such that the first and second engagement portions 87a and 87b are positioned between the hooking jaws 67 formed on the first guide groove 65. The first and second fastening pins 81a and 81b are resiliently fixed in the pin guide groove 75 due to an elastic force of the spring 89 and the hooking of the hooking jaws 67.

While no external force is applied to the first and second fastening pins 81a and 81b, the first and second fastening pins 81a and 81b are kept apart from each other by the elastic force of the spring 89. The first and second steps 88a and 88b of the first and second fastening pins 81a and 81b are resiliently engaged and secured to the hooking jaws 67 formed on the bottom surface of the first guide groove 65.

If an external force is applied to the first and second fastening pins 81a and 81b toward the spring 89, the first and second fastening pins 81a and 81b are brought close to each other along the pin guide groove 75 so that the first and second engagement portions 87a and 87b forms an alphabet letter 'T'. At this time, the spring 89 disposed between the first and second fastening pins 81a and 81b is compressed. The first and second steps 88a and 88b of the first and second engagement pins 81a and 81b are spaced from the hooking jaws 67 formed on the bottom surface of the first guide groove 65.

When the external force applied to the first and second fastening pins 81a and 81b is removed, the spring 89 stretches and the first and second fastening pins 81a and 81b return to their original positions. The first and second steps 88a and 88b of the first and second fastening pins 81a and 81b are resiliently fixed again to the hooking jaws 67 formed on the bottom surface of the first guide groove 65.

In a state that the first and second fastening pins 81a and 81b are supported by the hooking jaws 67, the first and second engagement portions 87a and 87b of the first and second fastening pins 81a and 81b are exposed upwardly through the pin passage hole 71. Furthermore, the first and second engagement portions 87a and 87b of the first and second fastening pins 81a and 81b protrudes the pin passage hole 71 so that the first and second engagement portions 87a and 87b can be stably coupled to a lower end of the coupling pin 90 that is inserted to the pin passage hole 71.

The upper surface of the upper body 69 is formed in a shape opposite to the outer surface of the cylinder block so that the upper surface of the upper body 69 can be stably attached to the outer surface of the cylinder block. For example, in case that the outer surface of the cylinder block is convex outwards, the upper surface of the upper body 69 may be recessed inwards.

Referring to FIGS. 9 and 10, the coupling pin 90 includes a head 91 and a shaft 93. The head 91 is installed at the other end of the installation hole 49 on the exterior surface of the cylinder block. The shaft 93, which elongates from the head 91 has the pin receiving recess 95 on its tail, can be inserted into the installation hole 49 so that the tail is coupled to the first and second fastening pins 81a and 81b.

The head 91 has a larger outer diameter than the shaft 93. The operator can perform the process of coupling the coupling pin 90 to the fastener 60 and separating the coupling pin 90 from the fastener 60 by utilizing the head 91 of the coupling pin 90.

The shaft 93 is integrally formed with the head 91 in a column shape and extends from the head 91. Even though the shaft 93 has a cylindrical shape in the exemplary embodiments shown in the drawings, the present disclosure is not limited thereto and the shaft 93 may be implemented in another shape such as an elliptical column or a polyprism.

The shaft 93 has the pin receiving recess 95 formed onto the tail which is an end opposite to the head 91. The pin receiving recess 95 may include an interior shape opposite to those of the first and second engagement portions 87a and 87b of the first and second fastening pins 81a and 81b to receive and fix the first and second engagement portions 87a and 87b. The pin receiving recess 95 has an inner diameter larger than a width of a combination of the first and second engagement portions 87a and 87b brought close to each other. In particular, the pin receiving recess 95 may have a diameter larger than a width the combination of the first and second engagement portions 87a and 87b spaced apart in an absence of the external force. The pin receiving recess 95 is formed with a stopper jaw 97 corresponding to the coupling jaws of the first and second engagement portions 87a and 87b. The inner diameter of the stopper jaw 97 is narrower than the inner diameter of the pin receiving recess 95.

Accordingly, when the first and second engagement portions 87a and 87b are inserted into the pin receiving recess 95 of the coupling pin 90, the coupling jaws of the first and second engagement portions 87a and 87b are locked and fixed by the stopper jaw 97 of the pin receiving recess 95. Thus, even when a force exerted in a direction opposite to the coupling pin 90 is applied, the coupling pin 90 coupled to the first and second fastening pins 81a and 81b maintains the coupling state stably.

Figure 11:
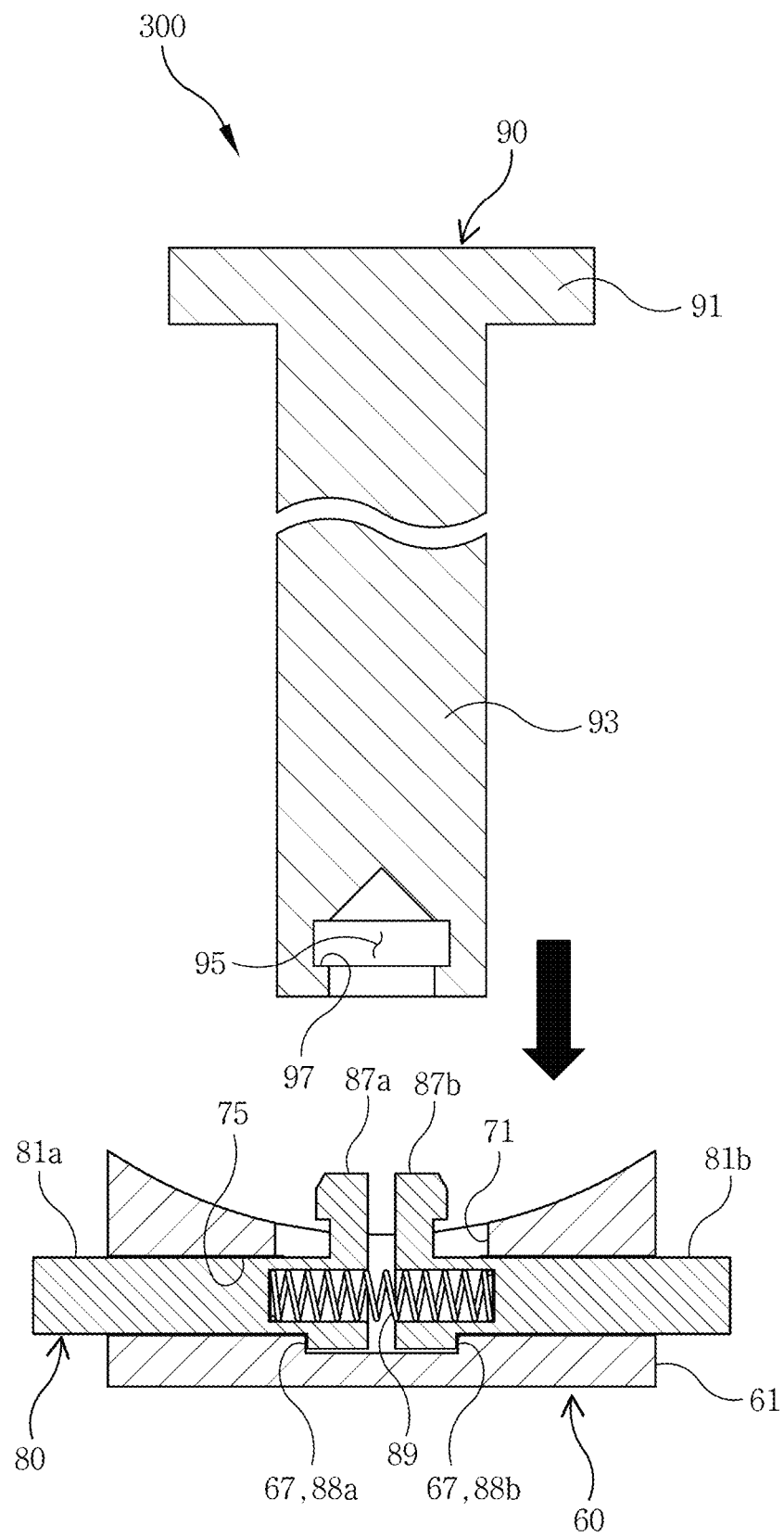
FIGS. 11-13 are cross-sectional views sequentially illustrating a process of engaging the coupling pin to a fastener.
Figure 12:
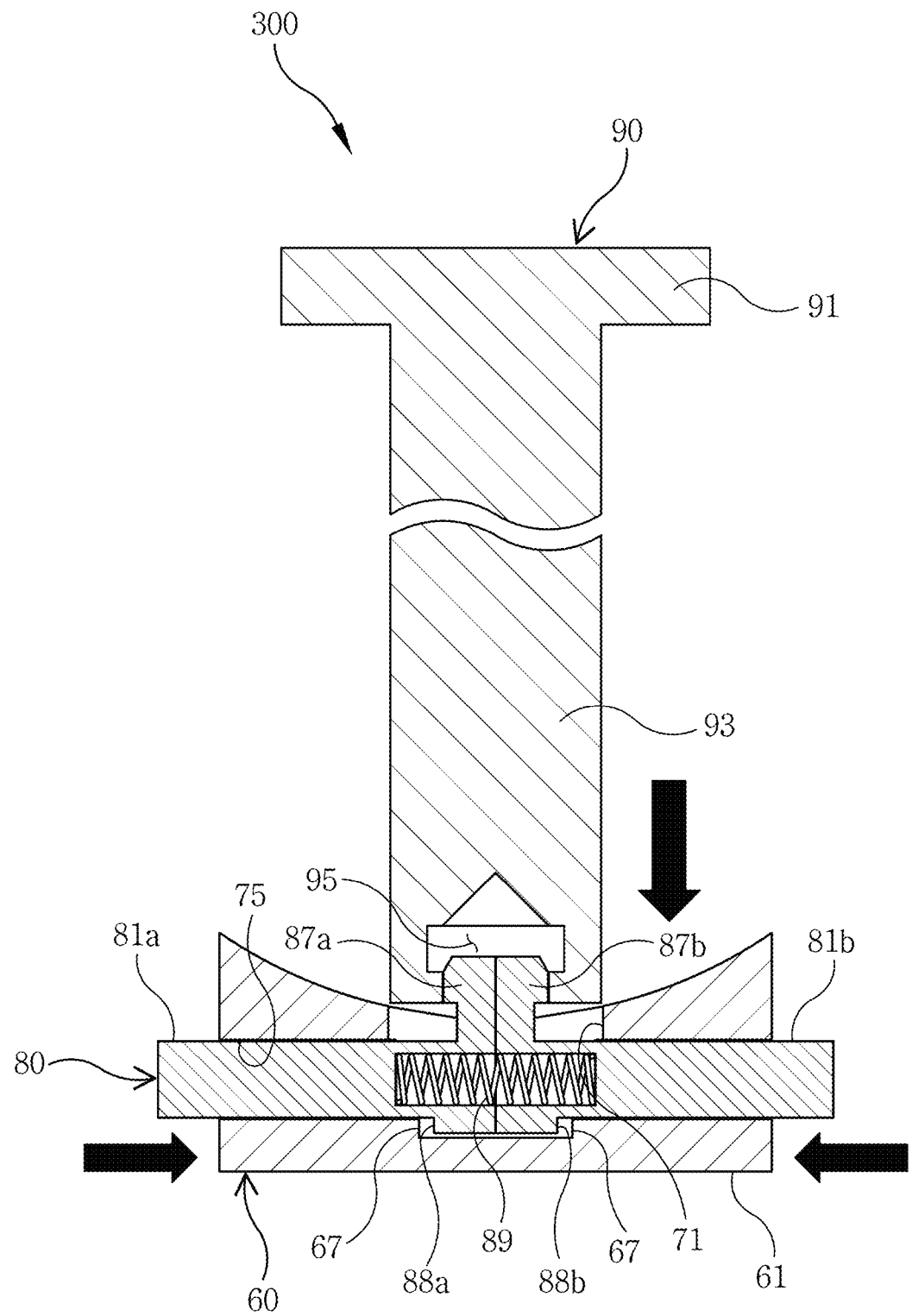
Figure 13:
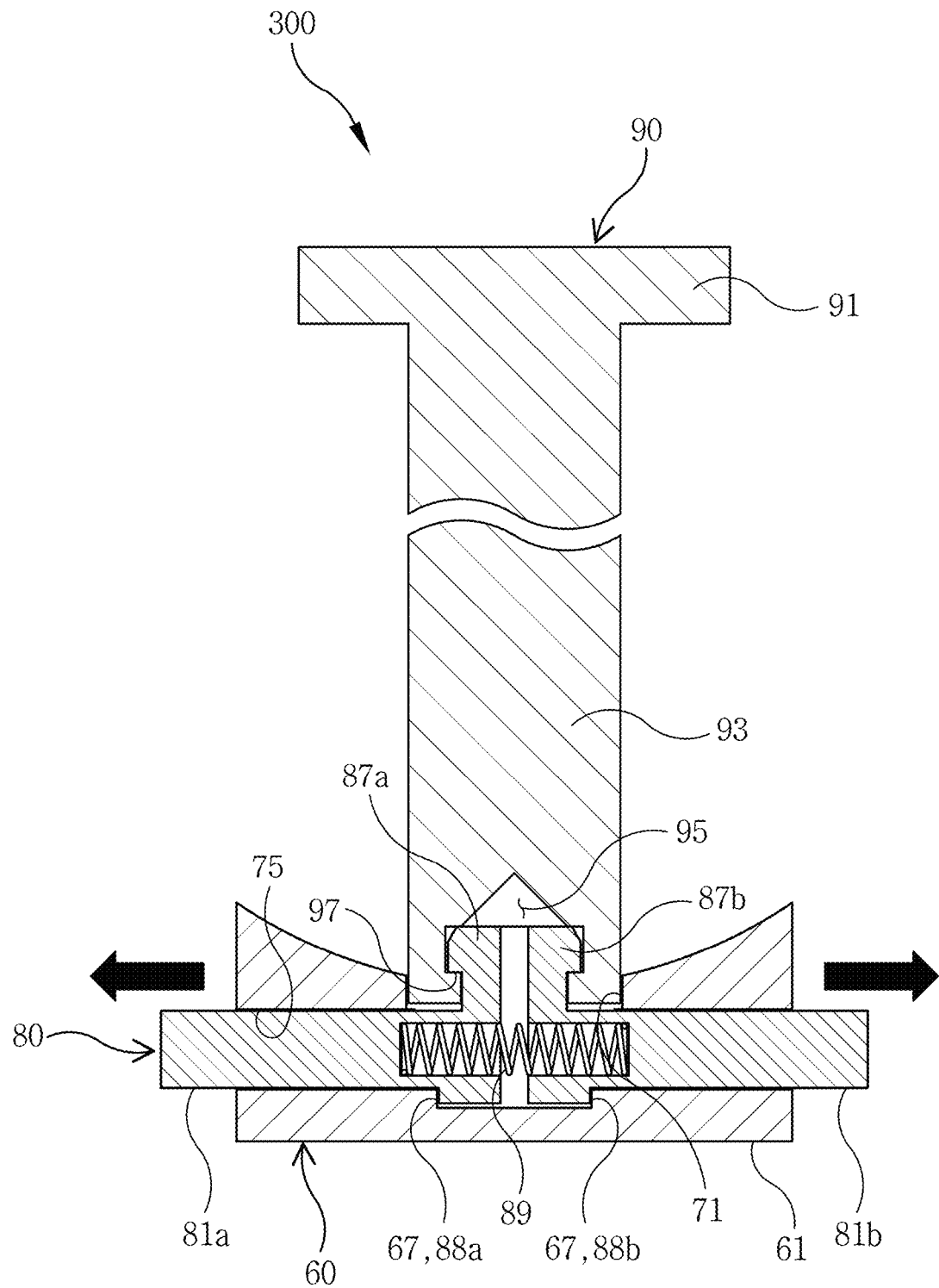
Figure 14:
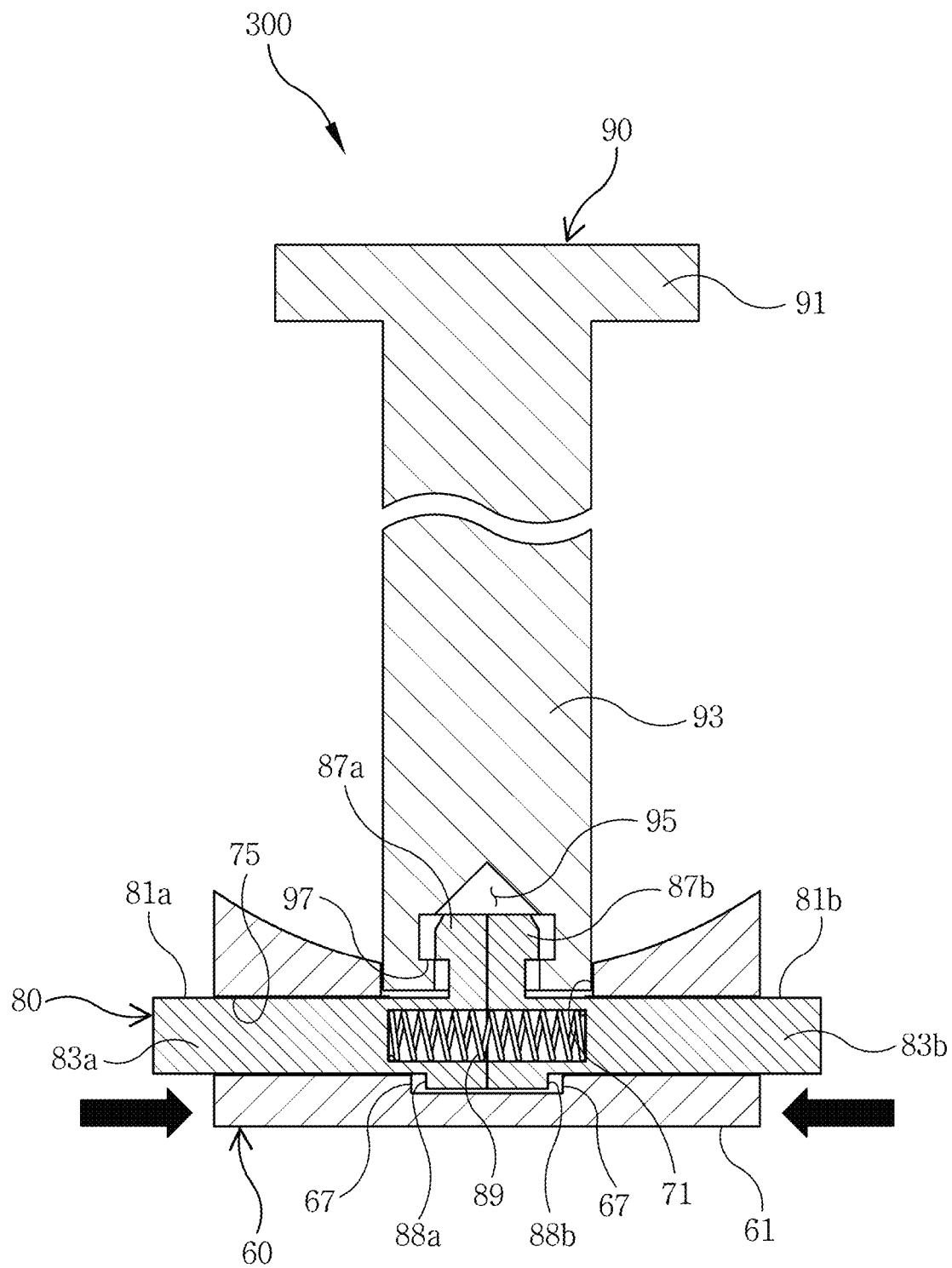
FIGS. 14-16 are cross-sectional views sequentially illustrating a process of detaching the coupling pin from the fastener.
Figure 15:
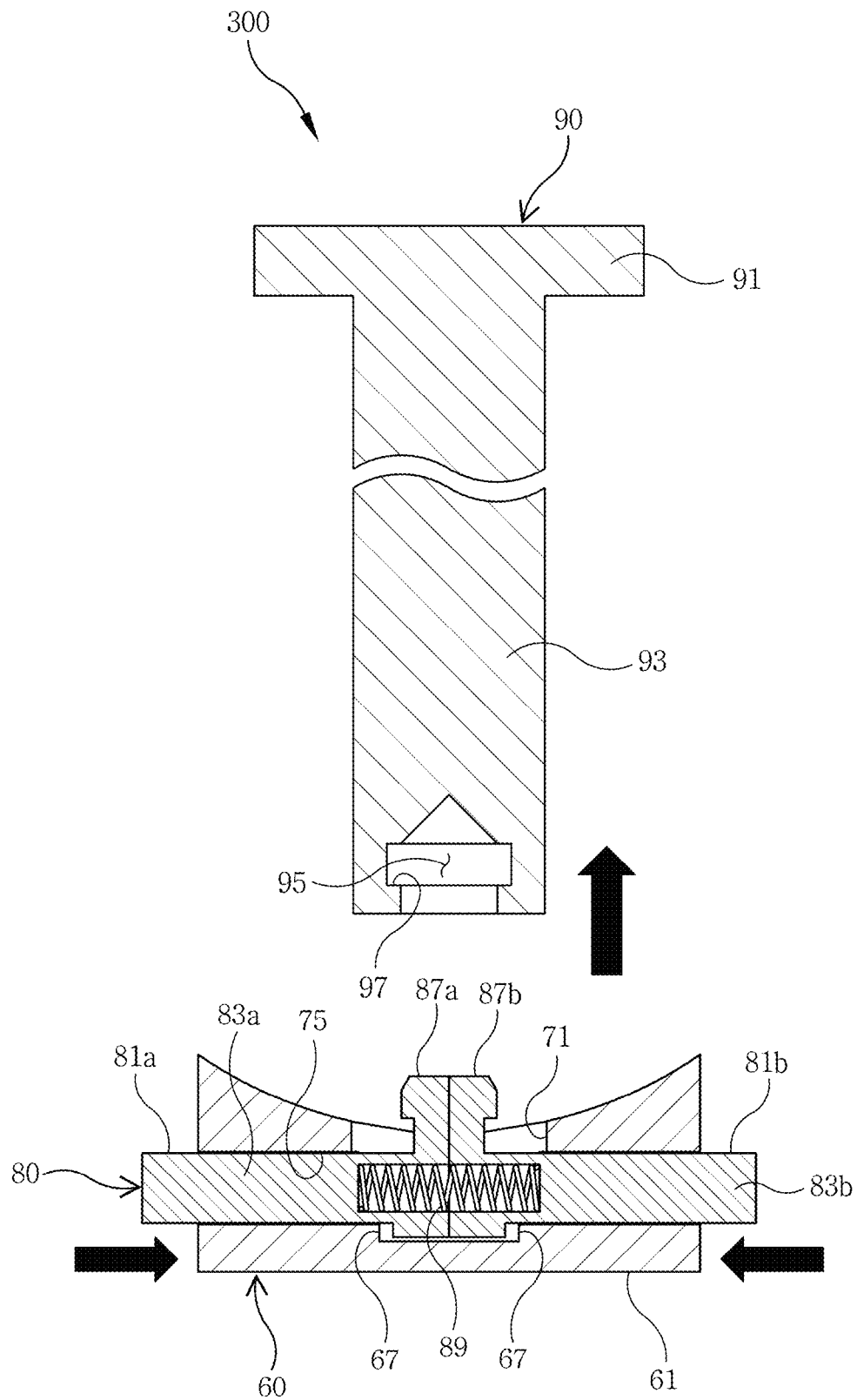
Figure 16:
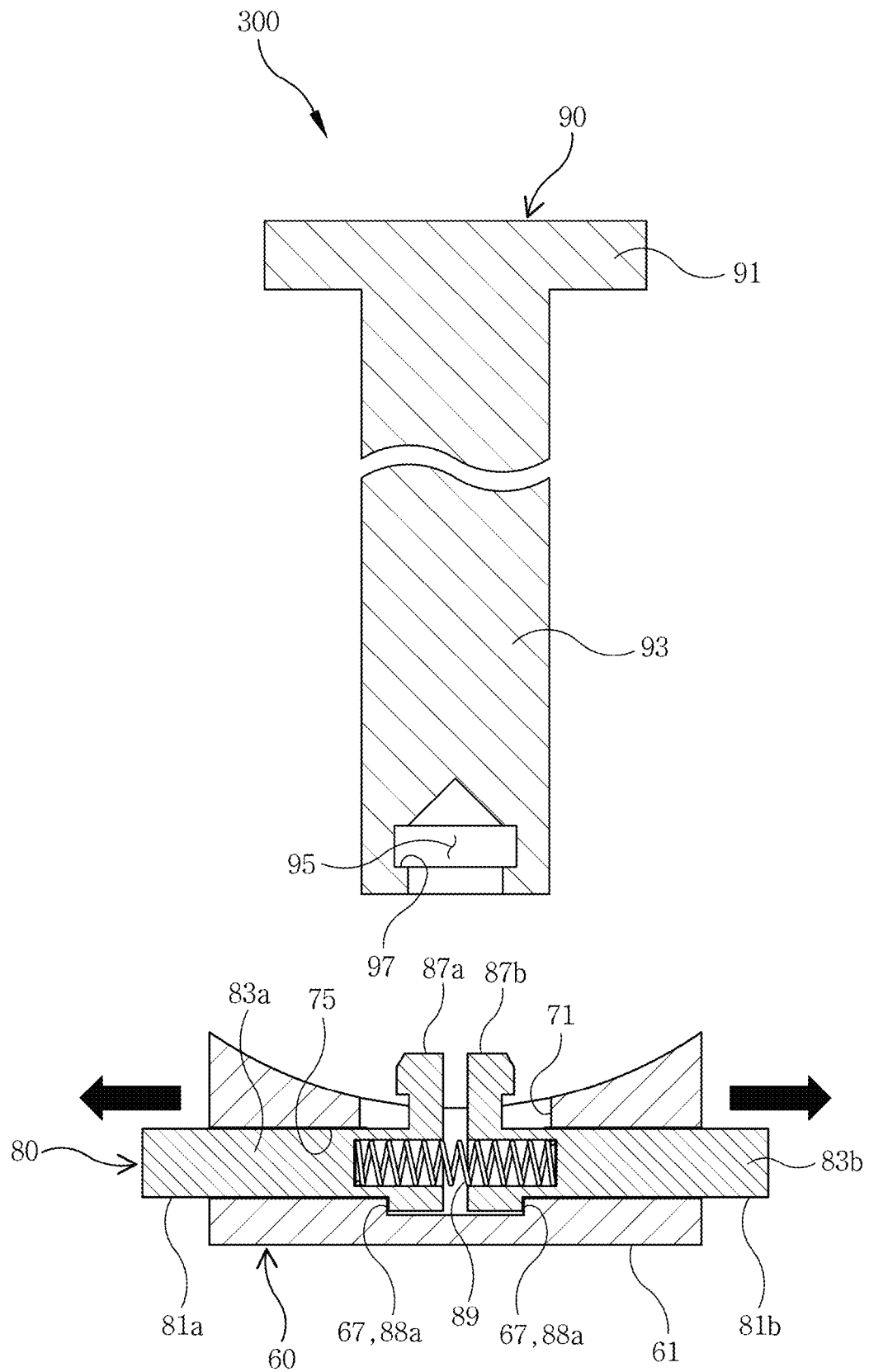

The operation of the connecting device 300 according to the first embodiment will now be described with reference to FIGS. 11-16. FIGS. 11-13 are cross-sectional views sequentially illustrating a process of engaging the coupling pin 90 to the fastener 60, and FIGS. 14-16 are cross-sectional views sequentially illustrating a process of detaching the coupling pin 90 from the fastener 60.

First, the sequence of coupling the coupling pin 90 to the fastener 60 is described with reference to FIGS. 11-13.

The coupling pin 90 is placed above the fastener 60. Then, the coupling pin 90 is moved toward the fastener 60. The fastener 60 may be installed on the outer surface of the second guide block 43 as shown in FIG. 5 even though it is not shown in FIG. 11. Also, the coupling piece 56 of the pressing power delivery unit 200b may be inserted through the guide slit 45 so that the pressing power delivery unit 200b may be coupled to the pressing power providing unit 100. The coupling pin 90 may be positioned to face the installation hole 49 and the insertion hole 57 aligned with each other from the first guide block 42.

As shown in FIG. 12, as the coupling pin 90 moves downwards to the upper surface of the fastener 60, the coupling pin 90 contacts upper ends of the first and second engagement portions 87a and 87b of the first and second fastening pins 81a and 81b.

If the coupling pin 90 moves further toward the fastener 60, upper ends of the first and second engagement portions 87a and 87b enter the pin receiving recess 95 of the coupling pin 90 past the stopper jaw 97 owing to the tapered portion of the coupling pin 90. At this time, the first and second engagement portions 87a and 87b become more proximate to each other as they pass the stopper jaw 97. The stopper jaw 97 exerts an external force on the first and second engagement portions 87a and 87b toward a center of the fastener 60. The spring 89 interposed between the first and second engagement portions 87a and 87b is compressed, and the first and second fastening pins 81a and 81b move toward the center of the fastener 60 in a state that the first and second engagement portion 87a and 87b are positioned in the pin guide hole 71.

As shown in FIG. 13, if the coupling pin 90 is moved further toward the fastener 60 and inserted into the pin passage hole 71 of the fastener 60, the first and second engagement portions 87a and 87b starts to enter the pin receiving recess 95 past the stopper jaw 67 of the coupling pins 90. The first and second engagement portions 87a and 87b having entered the pin receiving recess 95 that has a larger inner diameter than the stopper jaw 97 are spaced apart again from each other because of the restoration of the spring 89, and the coupling jaws of the first and second engagement portions 87a and 87b are locked at the stopper jaw 97. In other words, since the external force exerted on first and second engagement portion 87a and 87b due to the stopper jaw 97 is removed as the first and second engagement portion 87a and 87b leave the stopper jaw 97, the spring 89 expands and the first and second engagement portion 87a and 87b are separated from each other and are brought into close contact with an inner surface of the pin receiving recess 95 having an inner diameter larger than that of the stopper jaw 97. At this time, the first and second fastening pins 81a and 81b move outward from the center of the fastener 60 through the pin guide hole 71.

In this way, the coupling pin 90 can be coupled and fixed to the fastener 60 by the one-touch manipulation of inserting the coupling pin 90 into the fastener 60.

Next, the sequence of separating the coupling pin 90 from the fastener 60 is described with reference to FIGS. 14-16. The separation of the coupling pin 90 from the fastener 60 may be performed in a reverse order of the coupling process.

Referring to FIG. 14, an application of an external force directing the center of the fastener 60 applied to the first and second pushing portions 83a and 83b of the first and second fastening pins 81a and 81b causes the first and second fastening pins 81a and 81b to move toward the center of the fastener 60 through the pin guide groove 75. The spring 89 is compressed by the external force, and the spacing between the first and second engagement portions 87a and 87b is reduced.

As a result, the width of the combination of the first and second engagement portions 87a and 87b becomes smaller than the inner diameter of the stopper jaw 97 of the coupling pin 90. In other words, the coupling pin 90 is unlocked from the fastener 60 and is capable of being readily separated from the first and second fastening pins 81a and 81b of the fastener 60.

Next, as shown in FIG. 15, the coupling pin 90 may be raised and separated from the fastener 60. At this time, the external force applied to the first and second pushing portions 83a and 83b is maintained.

As shown in FIG. 16, when the external force applied to the first and second pushing portions 83a and 83b is removed, the spring 89 makes the first and second fastening pins 81a and 81b to restore their original positions. The first and second fastening pins 81a and 81b in the fastener 60 are moved away from each other through the pin guide groove 75, and the first and second steps 88a and 88b are locked at the hooking jaws 67 formed on the pin guide groove 75.

Thus, the coupling pin 90 can easily be separated from the fastener 60 by a simple operation of pressing the first and second fastening pins 81a and 81b of the fastener 60 and pulling the coupling pin 90 from the fastener 60.

Second Embodiment

Figure 18:
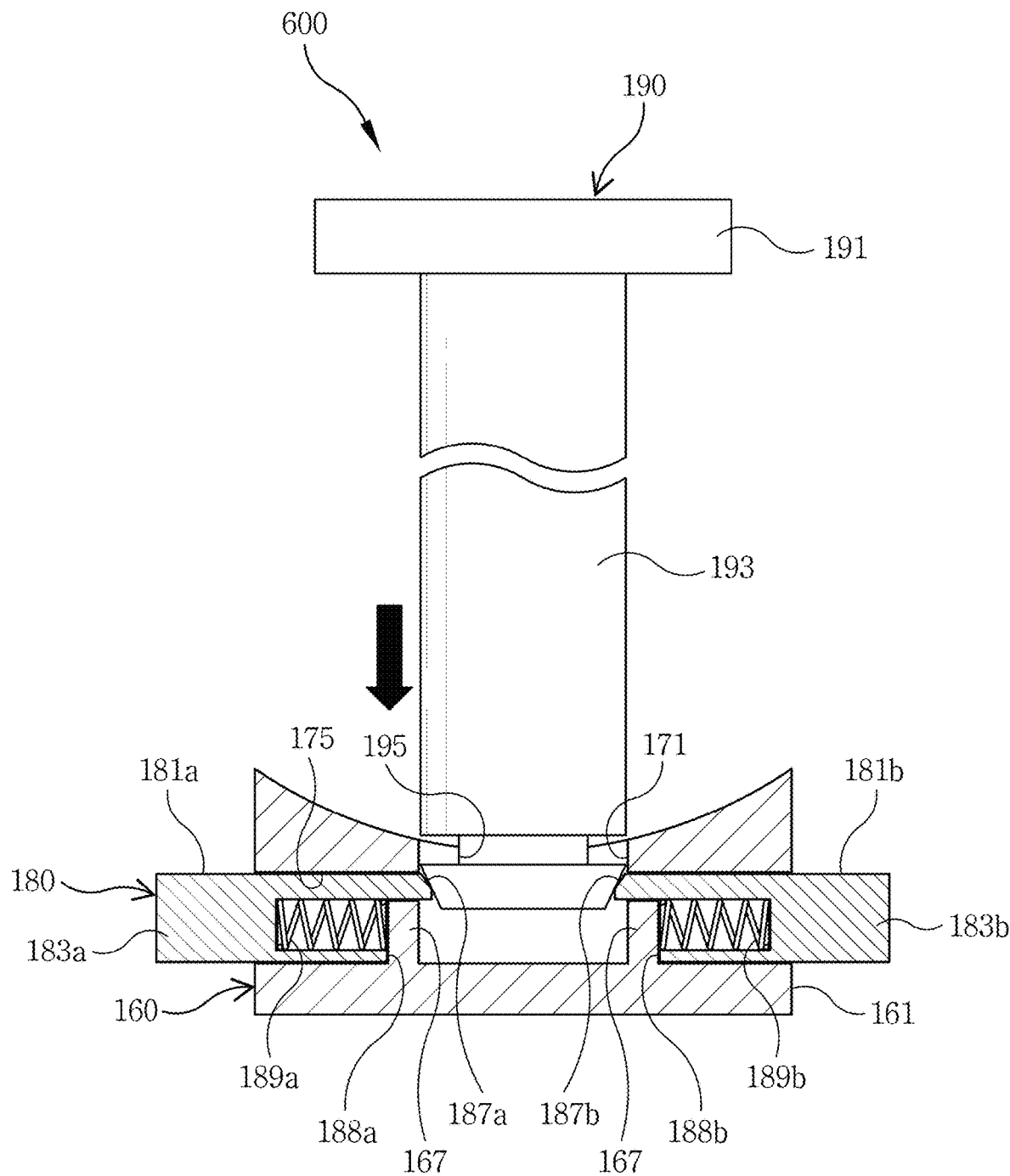

As described above, the connecting device 300 according to the first embodiment has the pin receiving recess 95 formed inward from the tail of the coupling pin 90, and the fastening pin 80 of the fastener 60 engages with the pin receiving recess 95. However, the present disclosure is not limited thereto. For example, as shown in FIGS. 17-19, a pin receiving recess 195 may be formed on the lateral surface of a coupling pin 190, and a fastening pin 180 of a fastener 160 may engage with the pin receiving recess 195.

FIG. 17 is a cross-sectional view of a connecting device 600 according to a second embodiment of the present disclosure.

Referring to FIG. 17, the connecting device 600 according to the second embodiment includes the fastener 160 having the fastening pin 180, and the coupling pin 190.

The fastener 160 includes a fastener body 161 and the fastening pin 180. The fastener body 161 is installed at one end of the installation hole 49 on an exterior surface of the cylinder block and guides the movement of the fastening pin 180. The fastening pin 180 is installed in the fastener body 161 to be movable elastically and is partially exposed to the installation hole 49.

The fastening pin 180 is resiliently engaged with the coupling pin 190 inserted into the installation hole, and can be separated from the coupling pin 190 by an external force. The fastening pin 180 includes a first fastening pin 181a, a second fastening pin 181b, and a first and second springs 189a and 189b configured to support the first and second fastening pins 181a and 181b, respectively. The first fastening pin 181a is installed in the fastener body 161 so as to elastically move along a direction perpendicular to the direction in which the coupling pin 190 is inserted. The second fastening pin 181b is disposed to be spaced apart by a certain distance from the first fastening pin 181a and is installed in the fastener body 161 so as to elastically move along a direction perpendicular to the direction in which the coupling pin 190 is inserted. The first and second fastening pins 181a and 181b are resiliently supported by the first and second springs 189a and 189b, respectively, connected to the fastener body 161.

The coupling pin 190 has a pin receiving recess 195 formed on a lateral surface near a tail end for receiving the first and second fastening pins 181a and 181b.

The first fastening pin 181a has a first engagement portion 187a and a first pushing portion 183a, and the second fastening pin 181b has a second engagement portion 187b and a second pushing portion 183b. The first and second engagement portions 187a and 187b are horizontally spaced apart from each other. The first and second pushing portions 183a and 183b are connected to the first and second engagement portions 187a and 187b, respectively, and are elongated in opposite directions.

The first and second engagement portion 187a and 187b are formed to protrude horizontally from respective ends of the first and second pushing portions 183a and 183b, respectively, facing each other. The first and second engagement portion 187a and 187b may be shorter than the first and second pushing portions 183a and 183b. Edges of the ends of the first and second engagement portion 87a and 87b facing each other are tapered so as to be pushed into the pin receiving recess 195 of the coupling pin 190.

The first and second pushing portions 83a and 83b are formed with a first and second steps 188a and 188b, respectively, on their lower surfaces so as to restrain strokes of horizontal linear motions of the first and second engagement portions 187a and 187b. In the second embodiment shown in the drawings, the first and second steps 188a and 188b are provided by forming the thickness of the first and second pushing portions 183a and 183b where the first and second engagement portions 187a and 187b are formed to be thicker than the other portions.

The first and second pushing portions 183a and 183b are formed with a first and second spring insertion recesses suitable for receiving respective ends of the first and second springs 189a and 189b. The first and second springs 189a and 189b are disposed between the fastener body 161 and the first and second pushing portions 183a and 183b, respectively. One ends of the first and second springs 189a and 189b are fixed at the fastener body 161. As a result, if the first and second pushing portions 183a and 183b are pulled in a radial direction from the fastener body 161, the first and second springs 189a and 189b are stretched. If the external force exerted on the first and second pushing portions 183a and 183b are removed, the first and second springs 189a and 189b are compressed restores their original lengths.

The external force exerted on the first and second fastening pins 181a and 181b may be applied to the first and second engagement portions 187a and 187b or to the first and second pushing portions 183a and 183b. The external force may be applied to the first and second engagement portions 187a and 187b when the coupling pin 190 is being coupled to the first and second fastening pins 181a and 181b, for example. In this case, the first and second engagement portions 187a and 187b may be elastically retracted backward (i.e. in the radial direction) by the coupling pin 190 being inserted between the first and second engagement portions 187a and 187b and the first and second springs 189a and 189b are stretched.

The external force may be applied to the first and second pushing portions 183a and 183b when the coupling pin 190 is to be separated from the first and second fastening pins 181a and 181b, for example. When the first and second pushing portions 183a and 183b are pulled outward from the pin passage hole 171, the spacing between the first and second engagement portions 187a and 187b is increased. In this case, the first and second springs 189a and 189b are stretched also.

The fastener body 161 is a frame for installing the first and second fastening pins 181a and 181b in the cylinder block. The fastener body 161 is formed with a pin guide groove 175 extending from one side to the opposite side of the fastener body 161 for guiding the movement of the first and second fastening pins 181a and 181b. Also, the fastener body 161 has a pin passage hole 171 that allows the pin guide groove 175 to communicate with the installation hole formed in the cylinder block. Thus, the first and second engagement portions 187a and 187b to be coupled to the coupling pin 190 can be exposed at least partially above the pin passage hole 171.

The pin guide groove 175 is formed with two hooking jaws 167 corresponding to the steps 188a and 188b of the first and second pushing portions 183a and 183b. The first and second fastening pins 181a and 181b are inserted into the pin guide groove 175 and installed such that the first and second engagement portions 187a and 187b are positioned between the hooking jaws 167 formed on the pin guide groove 175. The first and second fastening pins 181a and 181b are resiliently fixed in the pin guide groove 175 due to an elastic force of the first and second springs 189a and 189b and the hooking of the hooking jaws 167.

The coupling pin 190 includes a head 191 and a shaft 193. The head 191 is installed at the other end of the installation hole on the exterior surface of the cylinder block. The shaft 193, which elongates from the head 191 has the pin receiving recess 195 on the lateral surface near the tail, can be inserted into the installation hole so that the tail is coupled to the first and second fastening pins 181a and 181b.

The operation of the connecting device 600 according to the second embodiment will now be described with reference to FIGS. 17-19. FIGS. 18 and 19 are cross-sectional views illustrating a process of engaging the coupling pin 190 to the fastening pin 180 of the fastener 160.

First, the coupling pin 190 is first placed above the fastener 160, and the coupling pin 190 is moved toward the fastener 160.

The fastener 160 may be installed on the outer surface of the second guide block 43 as shown in FIG. 5 even though it is not shown in FIG. 17. Also, the coupling piece 56 of the pressing power delivery unit may be inserted through the guide slit 45 so that the pressing power delivery unit may be coupled to the pressing power providing unit. The coupling pin 190 may be positioned to face the installation hole 49 and the insertion hole 57 aligned with each other from the first guide block 42.

As shown in FIG. 18, as the coupling pin 190 moving downwards to the upper surface of the fastener 160 horizontally pushes out the first and second engagement portions 187a and 187b of the first and second engagement pins 181a and 181b. At this time, the first and second springs 189a and 189b are stretched.

Then, as shown in FIG. 19, if the coupling pin 190 is further moved toward the fastener 160 and inserted into the pin passage hole 171 of the fastener 160, the pin receiving recess 195 formed on the outer surface of the coupling pin 190 accommodates the first and second engagement portions 187a and 187b. Afterwards, the first and second springs 189a and 189b having been stretched are restored and the first and second engagement portions 187a and 187b are moved toward the pin receiving recess 195 of the coupling pin 190 and inserted therein.

In this way, the coupling pin 190 can be coupled and fixed to the fastener 160 by the one-touch manipulation of inserting the coupling pin 190 into the fastener 160.

The separation of the coupling pin 190 from the fastener 160 may be performed in a reverse order of the coupling process.

First, the first and second pushing portions 183a and 183b of the first and second coupling pins 181a and 181b are moved outward with respect to the center of the fastener 160, so that the first and second engagement portions 187a and 187b are moved out of the pin receiving recess 195 of the coupling pin 190. At this time, the first and second springs 189a and 189b are stretched.

Next, the coupling pin 190 may be raised and separated from the fastener 160. At this time, the external force applied to the first and second pushing portions 183a and 183b is maintained.

When the external force applied to the first and second pushing portions 183a and 183b is removed, the first and second springs 189a and 189b makes the first and second fastening pins 181a and 181b to restore their original positions.

In the above description, the fastening pins of the connecting device are divided into two, but the present disclosure is not limited thereto. For example, the coupling pin may be divided into two or more. For example, in case that the fastener has a rectangular parallelepiped shape similarly to the first embodiment, a first through fourth fastening pins may be provided for the four outer sides of the fastener. Also, in the case where the fastener has a disk shape, an arbitrary even number or odd number of fastening pins may be provided to the fastener.

The description of the disclosure is exemplary in nature and, thus, variations that do not depart from the substance of the disclosure are intended to be within the scope of the disclosure. Such variations are not to be regarded as a departure from the spirit and scope of the disclosure.

What is claimed is:

1. A pipe press-fit connecting apparatus, comprising:
a pressing power providing unit comprising a cylinder body, a cylinder rod having one end coupled to the cylinder body to move back and forth, and a cylinder block having one end coupled to the cylinder body, the cylinder block comprising a guide slit and an installation hole, the guide slit extending in a first axial direction of the cylinder block and configured to guide a movement of the cylinder rod, the installation hole formed near another end of the cylinder block and extending in a second direction perpendicular to the first axial direction and traversing the guide slit and cylinder block;
a connected unit comprising a coupling piece configured to be inserted into the guide slit of the pressing power providing unit, the coupling piece comprising an insertion hole configured to be aligned with the installation hole when the coupling piece of the connected unit is inserted into the guide slit of the cylinder block; and
a connecting device configured to align the installation hole of the pressing power providing unit and the insertion hole of the connected unit and couple the connected unit to the pressing power providing unit,
wherein the connecting device comprises:
a fastener installed at one end of the installation hole on an exterior surface of the cylinder block, the fastener comprising a fastener body and a fastening pin, the fastener body comprising a guide groove configured to at least partially receive the fastening pin, the fastening pin resiliently arranged in the guide groove and at least partially extending toward the installation hole of the cylinder block; and
a coupling pin inserted through the installation hole and the insertion hole through another end of the installation hole on the exterior surface of the cylinder block to be coupled to the fastening pin to couple the connected unit to the pressing power providing unit, the coupling pin comprising a pin receiving recess,
wherein the fastening pin comprises first and second pushing portions and first and second engagement portions respectively vertically protruding from the first and second pushing portions into the installation hole, wherein the first and second pushing portions are at least partially disposed outside the cylinder block, and configured to move along a direction perpendicular to a longitudinal axis of the coupling pin such that the fastening pin is engaged with the coupling pin, and
wherein the first and second engagement portions comprise coupling jaws configured to be inserted into and engaged with the pin receiving recess of the coupling pin such that the first and second engagement portions form a substantially T-shape when the first and second pushing portions are pushed toward each other.

2. The pipe press-fit connecting apparatus of claim 1, wherein edges of upper ends of the first and second engagement portion are tapered so as to be pushed into the pin receiving recess of the coupling pin, and wherein the tapered edges are disposed above the coupling jaws.

3. A pipe press-fit connecting apparatus of claim 1, comprising:
a pressing power providing unit comprising a cylinder body, a cylinder rod having one end coupled to the cylinder body to move back and forth, and a cylinder block having one end coupled to the cylinder body, the cylinder block comprising a guide slit and an installation hole, the guide slit extending in a first axial direction of the cylinder block and configured to guide a movement of the cylinder rod, the installation hole formed near another end of the cylinder block and extending in a second direction perpendicular to the first axial direction and traversing the guide slit and cylinder block;
a connected unit comprising a coupling piece configured to be inserted into the guide slit of the pressing power providing unit, the coupling piece comprising an insertion hole configured to be aligned with the installation hole when the coupling piece of the connected unit is inserted into the guide slit of the cylinder block; and
a connecting device configured to align the installation hole of the pressing power providing unit and the insertion hole of the connected unit and couple the connected unit to the pressing power providing unit,
wherein the connecting device comprises:
a fastener installed at one end of the installation hole on an exterior surface of the cylinder block, the fastener comprising a fastener body and a fastening pin, the fastener body comprising a guide groove configured to at least partially receive the fastening pin, the fastening pin resiliently arranged in the guide groove and at least partially extending toward the installation hole of the cylinder block; and
a coupling pin inserted through the installation hole and the insertion hole through another end of the installation hole on the exterior surface of the cylinder block to be coupled to the fastening pin to couple the connected unit to the pressing power providing unit, the coupling pin comprising a pin receiving recess,
wherein the fastening pin comprises first and second pushing portions and first and second engagement portions respectively vertically protruding from the first and second pushing portions into the installation hole, wherein the first and second pushing portions are at least partially disposed outside the cylinder block, and configured to move along a direction perpendicular to a longitudinal axis of the coupling pin such that the fastening pin is engaged with the coupling pin, and
wherein each of the first and second pushing portions comprises an end exposed outside the fastener body configured to allow an external force to push the first and second pushing portions toward each other.

4. A pipe press-fit connecting apparatus, comprising:
a pressing power providing unit comprising a cylinder body, a cylinder rod having one end coupled to the cylinder body to move back and forth, and a cylinder block having one end coupled to the cylinder body, the cylinder block comprising a guide slit and an installation hole, the guide slit extending in a first axial direction of the cylinder block and configured to guide a movement of the cylinder rod, the installation hole being formed near another end of the cylinder block and extending in a second direction perpendicular to the first axial direction and traversing the guide slit and cylinder block;
a connected unit comprising a coupling piece configured to be inserted into the guide slit of the cylinder block, the coupling piece comprising an insertion hole configured to be aligned with the installation hole when the coupling piece of the connected unit is inserted into the guide slit of the cylinder block; and
a connecting device configured to align the installation hole of the pressing power providing unit and the insertion hole of the connected unit and couple the connected unit to the pressing power providing unit,
wherein the connecting device comprises:
a fastener installed at one end of the installation hole on an exterior surface of the cylinder block and comprising a fastening pin configured to be resiliently arranged therein and at least partially be exposed to the installation hole; and
a coupling pin inserted through the installation hole and the insertion hole through another end of the installation hole on the exterior surface of the cylinder block to be resiliently coupled to the fastening pin to couple the connected unit to the pressing power providing unit, wherein the fastener comprises:

a fastener body installed at the one end of the installation hole on the exterior surface of the cylinder block and comprising a guide groove configured to guide a movement of the fastening pin; and the fastening pin resiliently installed in the guide groove of the fastener body and exposed at least partially to the installation hole, wherein the fastening pin is divided into a plurality of pins, resiliently coupled to the coupling pin inserted through the installation hole, and detached from the coupling pin by an external force, wherein the plurality of fastening pins comprise:

a first fastening pin at least partially received in the guide groove;

a second fastening pin at least partially received in the guide groove and disposed such that the first and second fastening pins face each other; and an elastic member disposed between the first and second fastening pins to maintain a spacing between the first and second fastening pins, and wherein the coupling pin comprises a pin receiving recess, on a bottom surface of a tail, configured to receive and fix some portion of the first and second fastening pins.

5. The pipe press-fit connecting apparatus of claim 4, wherein the first fastening pin comprises:

a first engagement portion configured to be detachably attached to the pin receiving recess of the coupling pin; and a first pushing portion extending outwards from the first engagement portion, wherein the second fastening pin comprises:

a second engagement portion configured to be detachably attached to the pin receiving recess of the coupling pin and facing the first engagement portion with an intervention of the elastic member therebetween; and a second pushing portion extending outwards from the second engagement portion toward a direction opposite to the first pushing portion, wherein, when the fastener is to be engaged with the coupling pin, the coupling pin is configured to move toward the first and second engagement portions so that the tail of the coupling pin presses the first and second engagement portions, the elastic member is compressed, the first and second engagement portions are brought close and inserted into the pin receiving recess of the coupling pin, and then the first and second engagement portions are separated from each other by a restoring force of the elastic member and fixed within the pin receiving recess of the coupling pin, wherein, when the fastener is to be detached from the coupling pin, the first and second pushing portions are configured to be brought close by a pressing of the first and second pushing portions so that the coupling pin is unlocked and retracted from the first and second engagement portions, and then the first and second engagement portions are separated from each other by the restoring force of the elastic member when the external force is removed.

6. The pipe press-fit connecting apparatus of claim 5, wherein the coupling pin comprises:

a head configured to be brought into close contact another end of the installation hole on the exterior surface of the cylinder block; and a shaft integrally formed with the head, inserted into the installation hole to be coupled to the first and second fastening pins, and having the pin receiving recess on the bottom surface of the tail.

7. The pipe press-fit connecting apparatus of claim 5, wherein the fastener body comprises:

a lower body having a first guide groove formed on an upper surface thereof and configured to guide the movement of the first and second pushing portions; and an upper body having a lower surface fixed to the upper surface of the lower body and an upper surface fixed to an outer surface of the cylinder block, and comprising a second guide groove on the lower surface corresponding to the first guide groove to guide the movement of the first and second pushing portions and a pin passage hole penetrating the lower surface and the upper surface of the upper body and configured to communicate with the installation hole, wherein the first and second engagement portions are exposed at least partially through the pin passage hole, and the coupling pin is inserted through the pin passage hole.

* * * * *